United States Patent
Lee et al.

(10) Patent No.: US 11,112,921 B2
(45) Date of Patent: Sep. 7, 2021

(54) TOUCH DISPLAY PANEL

(71) Applicant: AU Optronics Corporation, Hsin-Chu (TW)

(72) Inventors: Chia-Chi Lee, Hsin-Chu (TW); Chi-Cheng Chen, Hsin-Chu (TW); Jing-Siang Syu, Hsin-Chu (TW); Shu-Wen Tzeng, Hsin-Chu (TW); Gui-Wen Liu, Hsin-Chu (TW); Zeng-De Chen, Hsin-Chu (TW); Wen-Rei Guo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/537,679

(22) Filed: Aug. 12, 2019

(65) Prior Publication Data
US 2020/0089371 A1 Mar. 19, 2020

(30) Foreign Application Priority Data

Sep. 14, 2018 (TW) .................................. 107132519
Apr. 25, 2019 (TW) .................................. 108114561

(51) Int. Cl.
*G06F 3/044* (2006.01)
*G02F 1/1335* (2006.01)
*G02F 1/1333* (2006.01)

(52) U.S. Cl.
CPC ........ *G06F 3/0446* (2019.05); *G02F 1/13338* (2013.01); *G02F 1/133514* (2013.01)

(58) Field of Classification Search
CPC ......... G06F 3/0446; G06F 2203/04107; G06F 3/0445; G06F 3/0414; G06F 3/044;
(Continued)

(56) References Cited

U.S. PATENT DOCUMENTS 8,797,295 B2   8/2014 Bernstein et al.
2011/0128254 A1*  6/2011 Teranishi ................ G06F 3/044
                                                    345/174
(Continued)

FOREIGN PATENT DOCUMENTS

CN   102338945 A   2/2012
CN   108021288 A   5/2018
(Continued)

*Primary Examiner* — Christopher J Kohlman
(74) *Attorney, Agent, or Firm* — WPAT, PC

(57) ABSTRACT

A touch display panel includes a first sensing matrix and a second sensing matrix. The first sensing matrix includes a plurality of grid units and a first switch unit. The grid units are arranged in matrix, wherein each grid unit includes at least one first electrode. The first switch unit includes a plurality of switches, and the switches are disposed between adjacent grid units. Wherein, the control end of the switches is configured to receive a first controlling signal, and one end of each of the switches is configured to output a sensing signal. The second sensing matrix includes at least one second electrode, and is configured to receive a common signal. The second sensing matrix includes a plurality of opening units, and each opening unit overlaps with the open area of each pixel circuit in a vertical projection direction of the first substrate.

18 Claims, 25 Drawing Sheets

(58) Field of Classification Search
CPC ......... G06F 3/0412; G06F 2203/04105; G02F 1/133514; G02F 1/13338
See application file for complete search history.

(56) References Cited

U.S. PATENT DOCUMENTS

| | | |
|---|---|---|
| 2016/0098140 A1 | 4/2016 | Lee et al. |
| 2017/0068360 A1* | 3/2017 | Yuan ..................... G06F 3/0416 |
| 2019/0080131 A1 | 3/2019 | Lee et al. |
| 2019/0272057 A1* | 9/2019 | Chen ..................... G06F 3/0416 |

FOREIGN PATENT DOCUMENTS

| | | |
|---|---|---|
| CN | 108108073 A | 6/2018 |
| TW | 201614441 A | 4/2016 |
| TW | 201913338 A | 4/2019 |

\* cited by examiner

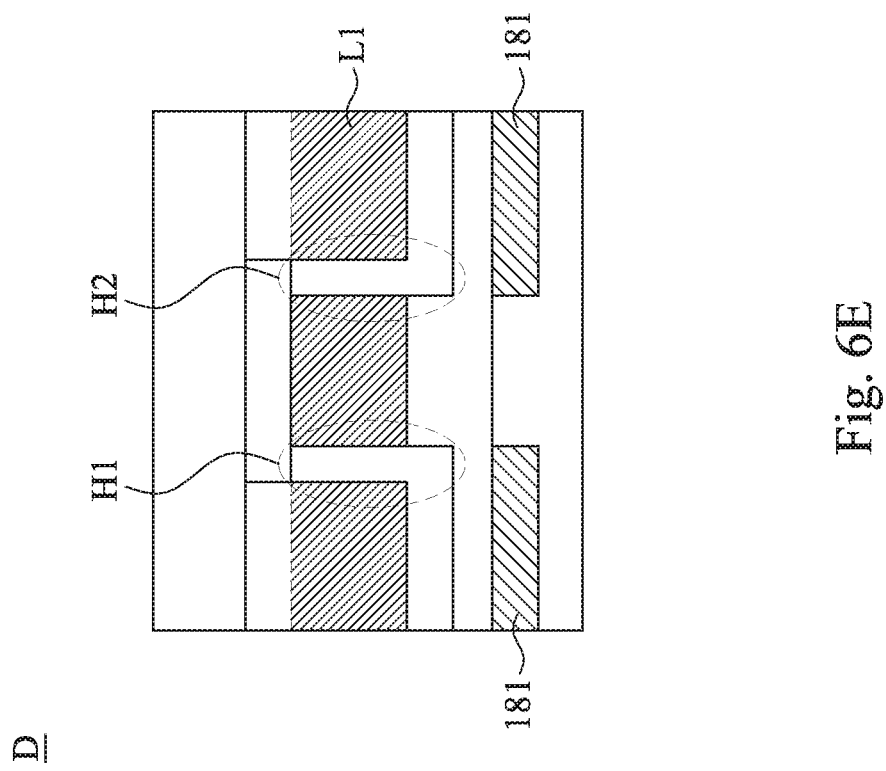

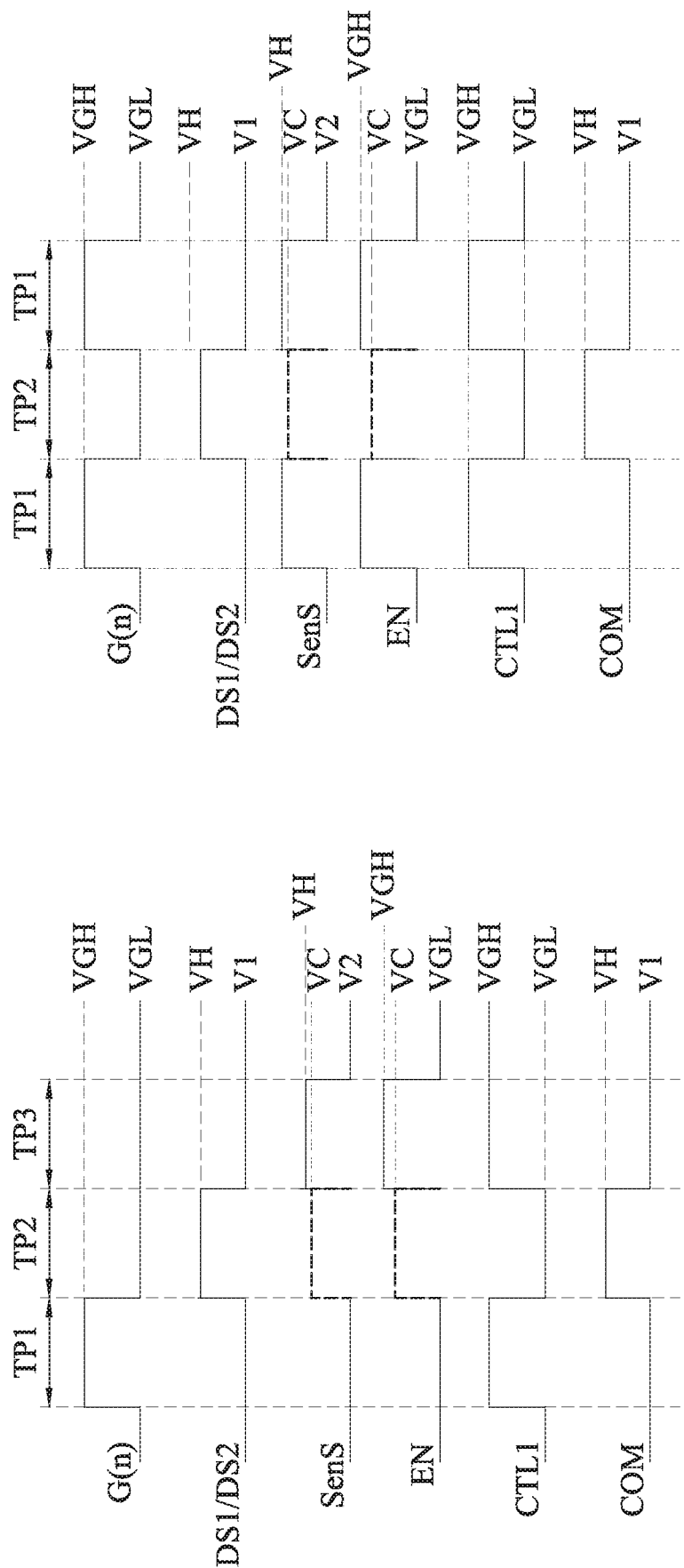

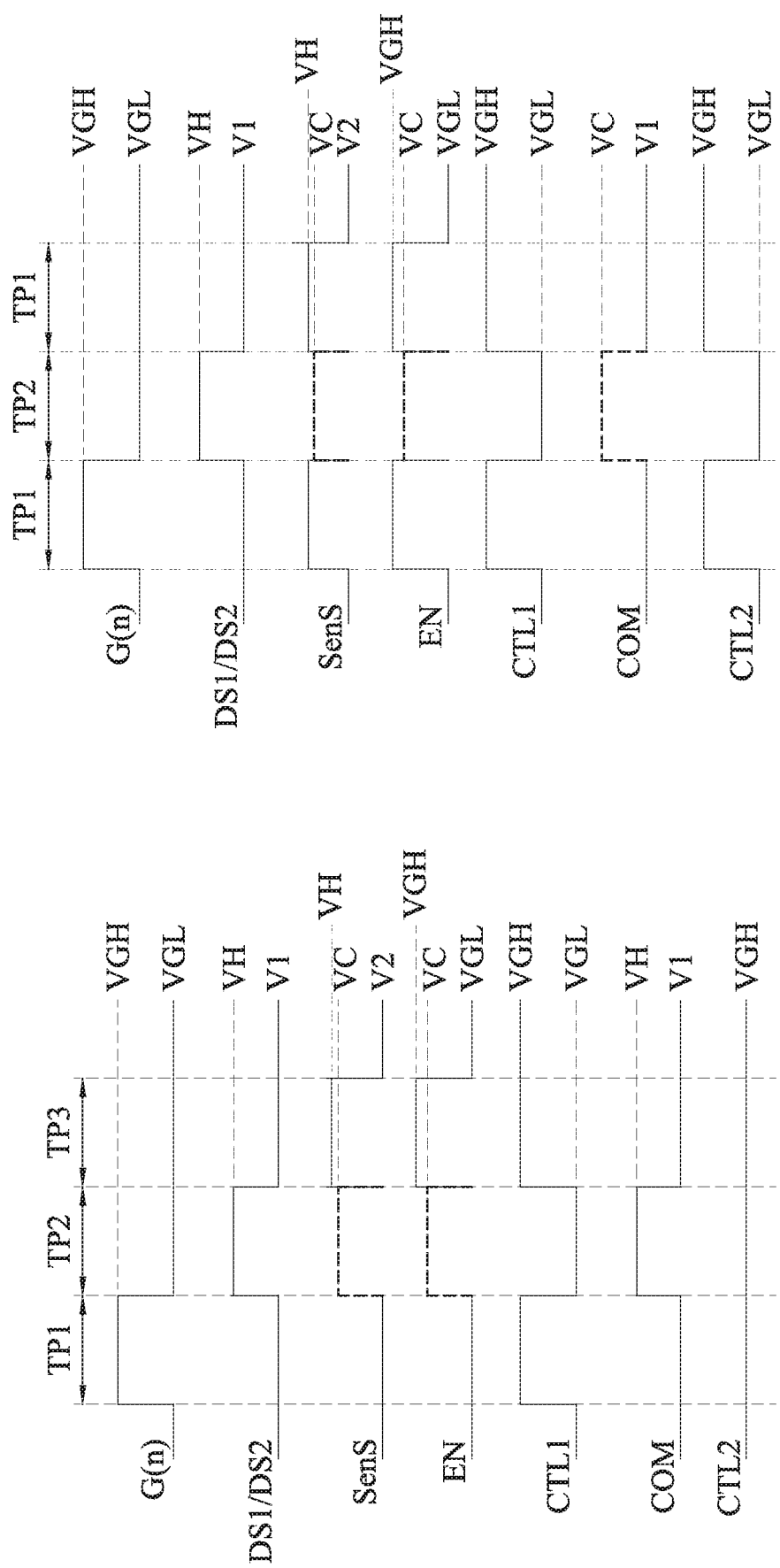

TOUCH DISPLAY PANEL

CROSS-REFERENCE TO RELATED APPLICATION

This application claims priority to Taiwanese Application Serial Number 107132519 filed on Sep. 14, 2018, and Taiwanese Application Serial Number 108114561, filed on Apr. 25, 2019, the disclosures of which are incorporated herein by reference in their entireties.

BACKGROUND

Field of Invention

The present invention relates to a touch display panel. More particularly, the present invention relates to a touch display panel integrated with a fingerprint recognition function, a force sensing function and a touch function.

Description of Related Art

With the rapid development of touch display technology, the touch display panels have been widely used in smart devices (smart phone, tablet, or notebook computer). Recently, the smart devices usually have a fingerprint recognition area which can provide users with fingerprints as passwords to unlock the smart device. Moreover, with the advance of force touch technology, current display panels will also have the force touch function. Therefore, if the touch display panel combines with the fingerprint recognition function and the force sensing function, it will be provided the fingerprint recognition function and the force sensing function to users without decreasing size of the display area.

SUMMARY

The invention provides a touch display panel having a display area and a peripheral area adjacent to the display area. The first sensing matrix is disposed on one side of a first substrate and the display area, and the first sensing matrix includes a plurality of grid units and a first switch unit. The plurality of grid units is arranged in matrix, wherein each of the grid units comprises at least one first electrode. The first switch unit includes a plurality of switches, which are disposed adjacent to one side of the plurality of grid units, wherein a control end of the plurality of switches is configured to receive a first controlling signal; one end of each of the switches is electrically connected to one of the plurality of grid units, and the plurality of switches are configured to transmit a sensing signal according to the first controlling signal. The second sensing matrix is disposed on the one side of the first substrate and the display area, and the second sensing matrix includes at least one second electrode, and is configured to receive a common signal. The second sensing matrix includes a plurality of opening units; each of the opening units overlaps with an open area of each pixel circuit in a vertical projection direction of the first substrate.

The invention provides a touch display panel having a display area and a peripheral area adjacent to the display area. The touch display panel includes a first sensing matrix and a second sensing matrix. The first sensing matrix is disposed on one side of a first substrate and the display area. The first sensing matrix includes a plurality of first data lines, a plurality of first gate lines, and a plurality of first units. The plurality of first units includes a plurality of first switches and a plurality of first electrodes. The plurality of first switches includes a first control end, a first end and a second end. The first control end of each of the first switches is electrically connected to one of the plurality of first data lines; the first end of each of the first switches is electrically connected to one of the plurality of first gate lines; the second end of each of the first switches is electrically connected to one of the plurality of first electrodes. The second sensing matrix is disposed on the one side of the first substrate. The second sensing matrix includes at least one second electrode, and is configured to receive a common signal. The second sensing matrix includes a plurality of opening units; each of the opening units overlaps with an open area of each pixel circuit in a vertical projection direction of the first substrate.

The invention provides a touch display panel having a display area and a peripheral area adjacent to the display area. The touch display panel includes a first electrode layer and a second electrode layer. The first electrode layer is disposed on one side of a first substrate and the display area. The first electrode layer includes a grid unit and a first switch unit. The grid unit includes a first electrode. One end of the first switch unit is electrically connected to a sensing data line, and another end of the first switch unit is electrically connected to the grid unit. The second electrode layer is disposed on one side of the first substrate and the display area, and the second electrode layer is configured to receive a common signal. The second electrode layer includes a second electrode and an opening unit. The opening unit overlaps with an open area of a pixel circuit in a vertical projection direction of the first substrate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2A is a partially enlarged schematic diagram illustrating the touch display panel according to a second embodiment of this disclosure.

FIG. 2B is a timing diagram illustrating the driving signal of the touch display panel according to a second embodiment of this disclosure.

FIG. 6E is a simplified cross-sectional view along wire in the area D of FIG. 4C according to an embodiment of the present disclosure.

FIG. 7A is a timing diagram illustrating the driving signal of the touch display panel according to a first embodiment of this disclosure.

FIG. 7B is a timing diagram illustrating the driving signal of the touch display panel according to a second embodiment of this disclosure.

FIG. 7C is a timing diagram illustrating the driving signal of the touch display panel according to a third embodiment of this disclosure.

FIG. 7D is a timing diagram illustrating the driving signal of the touch display panel according to a fourth embodiment of this disclosure.

DETAILED DESCRIPTION

Figure 1:
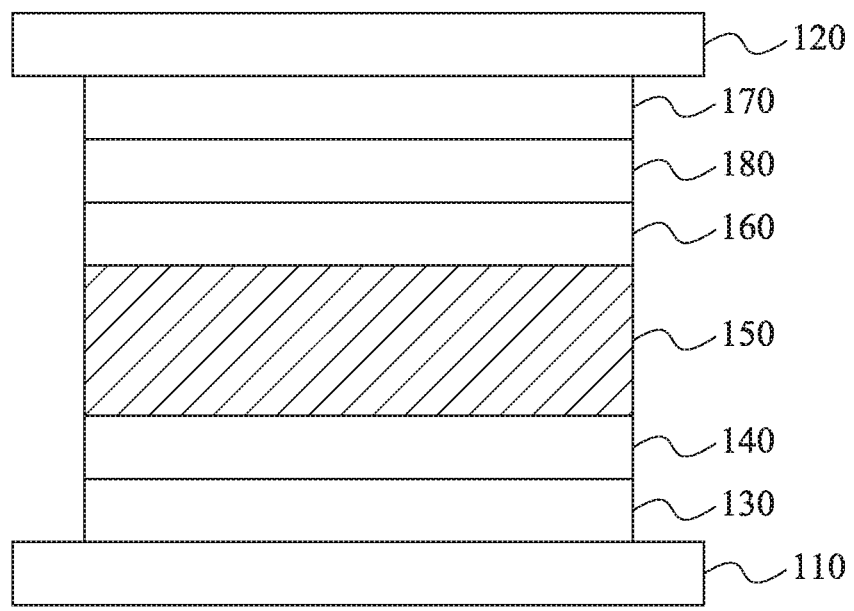
FIG. 1 is a structural schematic diagram of a touch display panel according to one embodiment of the present disclosure.

Reference will now be made in detail to the present embodiments of the invention, examples of which are illustrated in the accompanying drawings. Wherever possible, the same reference labels are used in the drawings and the description to refer to the same or like parts, components, or operations.

Reference is made to FIG. 1. FIG. 1 is a structural schematic diagram of a touch display panel 100 according to one embodiment of the present disclosure. As shown in FIG. 1, the touch display panel 100 includes a substrate 110, a substrate 120, a display array 130, a touch sensing matrix 140, a display medium 150, a color filter layer 160, a first sensing matrix 170, and a second sensing matrix 180. Wherein the substrate 110 and 120 can be implemented as a combination of a polarization plate and a glass substrate, and the display medium 150 can be implemented as liquid crystal. The touch sensing matrix 140 can be implemented as an electrode layer composed by the touch sensors. The first sensing matrix 170 can be implemented as an electrode layer composed by the fingerprint sensors (FPS). The second sensing matrix 180 can be implemented as a common electrode layer of the fingerprint sensors.

In the embodiment, as shown in FIG. 1, the touch sensing matrix 140 is disposed on an upper surface of the substrate 110, and the first sensing matrix 170 and the second sensing matrix 180 are disposed on a lower surface of the substrate 110. The second sensing matrix 180 is arranged between the first sensing matrix 170 and the touch sensing matrix 140. The substrate 110 and the substrate 120 are opposite arranged. Afterwards, the display array 130 is disposed on the upper surface of the substrate 110, and the display array 130 is arranged between the substrate 110 and the touch sensing matrix 140. The touch sensing matrix 140 is one layer of the display array 130. The color filter layer 160 is disposed on the lower surface of the substrate 120, and color filter layer 160 is arranged between the display medium 150 and the second sensing matrix 180. The display medium 150 is arranged between the substrate 110 and the substrate 120.

Figure 2A:
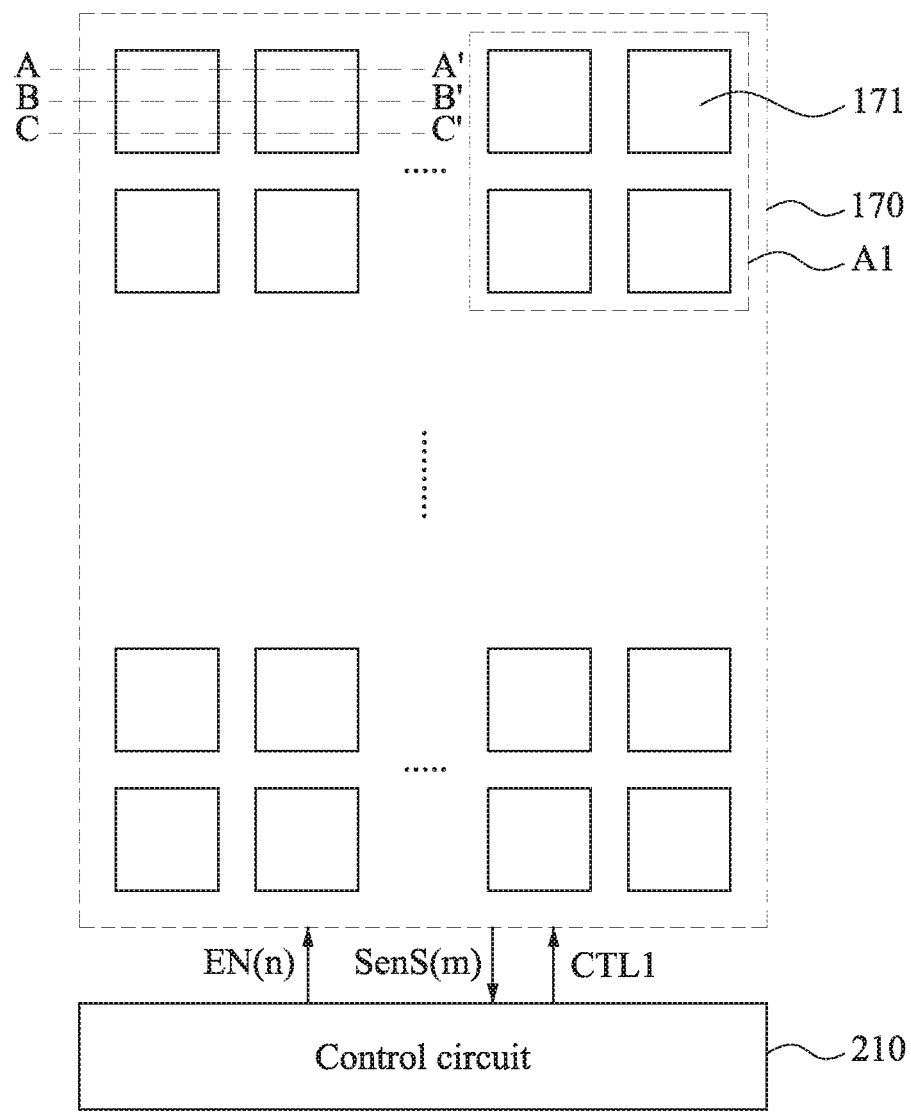
FIG. 2A is a schematic diagram of the first sensing matrix according to a first embodiment of the present disclosure.

Reference is made to FIG. 2A. FIG. 2A is a schematic diagram of the first sensing matrix 170 according to a first embodiment of the present disclosure. As shown in FIG. 2A, the first sensing matrix 170 includes a plurality of grid units 171 and a first switch unit (not shown in FIG. 2A). The grid units 171 includes a plurality of sensing units 1711 (not shown in FIG. 2A), and the grid units are arranged in matrix. Wherein, the first sensing matrix 170 is configured to receive a controlling signal CTL1 and an enable signal EN(n) from a control circuit 210, and transmit a sensing signal SenS(m) to the control circuit 210.

Figure 2B:
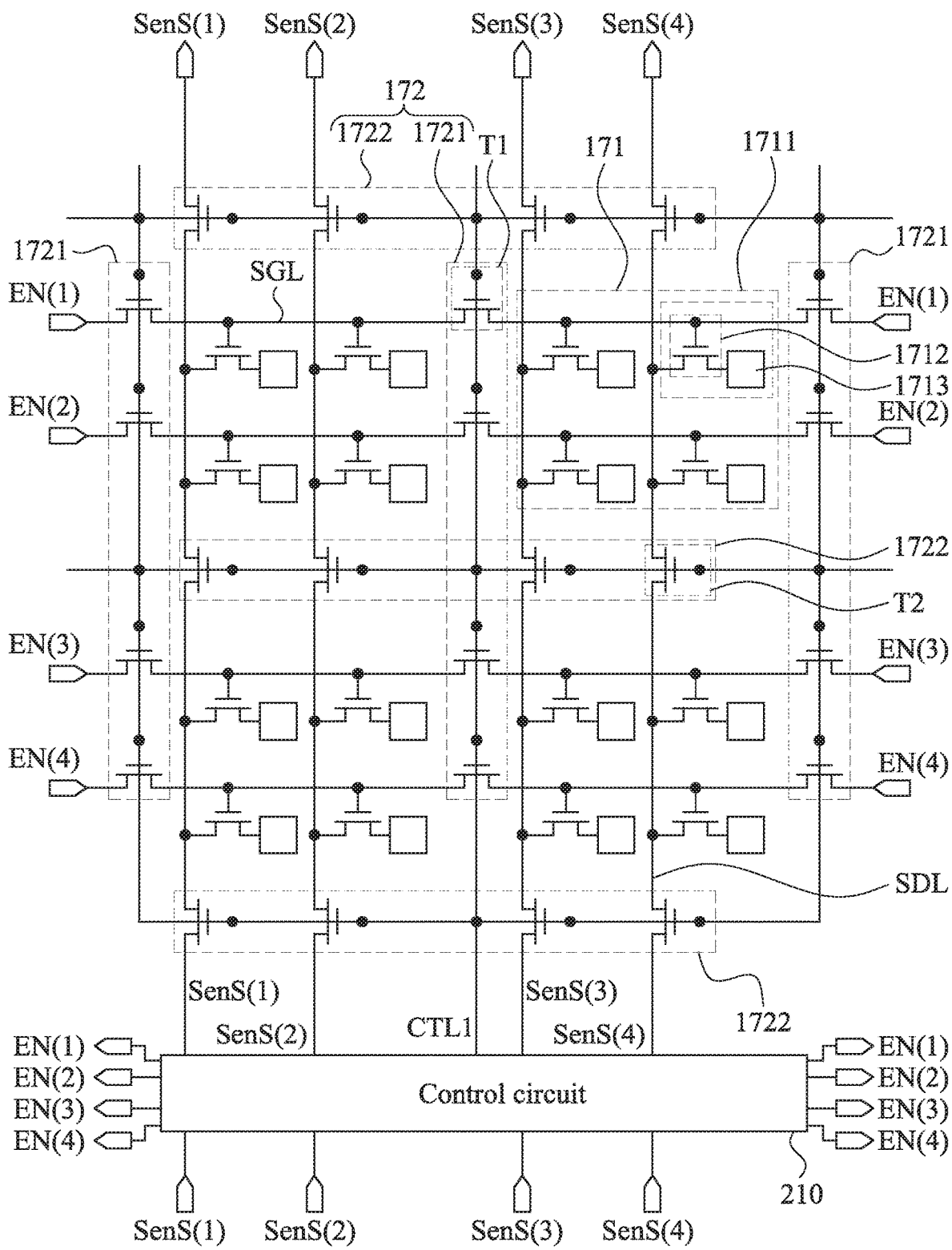
FIG. 2B is a partially enlarged schematic diagram illustrating the area A1 of the FIG. 2A according to one embodiment of the present disclosure.

Reference is made to FIG. 2B. FIG. 2B is a partially enlarged schematic diagram illustrating the area A1 of the FIG. 2A according to one embodiment of the present disclosure. As the embodiment shown in FIG. 2B, the grid units 171 includes four sensing units 1711. However, the disclosure is not limited thereto. In another embodiment, the number of 60×66 sensing units 1711 can compose one grid unit 171, and wherein the size of one sensing unit 1711 is substantially the same as the size of one pixel unit. S shown in FIG. 2B, the sensing units 1711 includes switch 1712 and a sensing electrode 1713. The first end of the switch 1712 is electrically connected to the sensing data line SDL; the second end of the switch 1712 is electrically connected to the sensing electrode 1713, and the control end of the switch 1712 is electrically connected to the sensing gate data line SGL.

Afterwards, as the embodiment shown in FIG. 2B, with respect to the four sensing gate lines SGL and four sensing data lines SDL and their associated driving signals as an example. In this case, the first sensing gate line SGL is configured to transmit the enable signal EN(1) to conduct the switch 1712, and the sensing data line SDL is configured to transmit the sensing signal SenS(1) to the control circuit. Other sensing gate lines and other sensing data lines have similar operation, for the sake of brevity; those descriptions will not be repeated here. Based on aforesaid embodiment, the first sensing matrix 170 has the first to nth sensing gate lines SGL to transmit the enable signals EN(1)~EN(n), respectively. The first sensing matrix 170 has the first to mth sensing data lines SDL to transmit the sensing signal SenS (1)~SenS(m), respectively.

Afterwards, for the sake of brevity, in the specification and drawings, if a reference label of a particular component or signal is used without having the index, it means that the reference label is used to refer to any unspecific component or signals of corresponding component group or signals group. For example, the reference label EN is used to refer to any unspecific enable signal of the enable signals EN(1) ~EN(n). In another example, the reference label SenS is used to refer to any unspecific sensing signal of the sensing signals SenS(1)~SenS(m).

Afterwards, the switch unit 172 includes a plurality of first switches 1721 and a plurality of second switches 1722. As shown in FIG. 2B, the grid units 171 includes twelve first switches 1721 and twelve second switches 1722. With respect to one of the first switches 1721 as an example, a first end and a second end of the switch T1 are electrically connected between two adjacent grid units, respectively. The first end and the second end of the switch T1 are electrically connected to the sensing gate lines SGL, and a control end of the switch T1 is configured to receive the controlling signal CTL1 from the control circuit 210.

Afterwards, With respect to one of the second switches 1722 as an example, a first end and a second end of the switch T2 are electrically connected between two adjacent grid units, respectively. The first end and the second end of the switch T2 are electrically connected to the sensing data lines SDL, and a control end of the switch T2 is configured to receive the controlling signal CTL1 from the control circuit 210. Wherein, when the first switches 1721 and the second switches 1722 are conducted, the first switches 1721 is configured to receive the enable signal EN provided by the control circuit 210, and conduct the switch 1712 of the sensing units 1711 according to the enable signal EN. The sensing signal SenS sensed by sensing electrode 1713 is transmitted to the control circuit 210 via the second switches 1722 and the sensing data lines SDL.

Figure 2C:
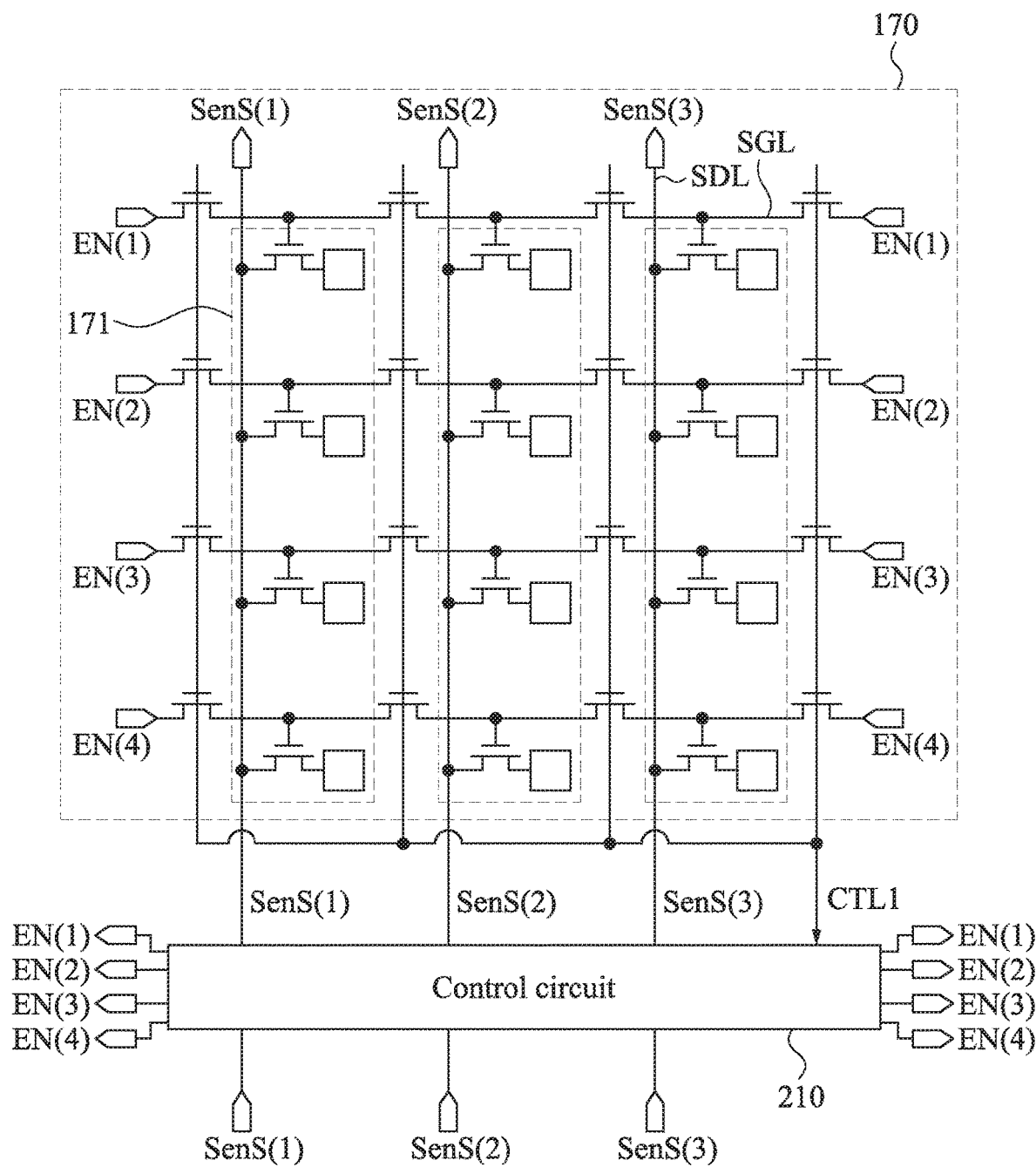
FIG. 2C is a schematic diagram of the first sensing matrix according to a second embodiment of the present disclosure.
Figure 2D:
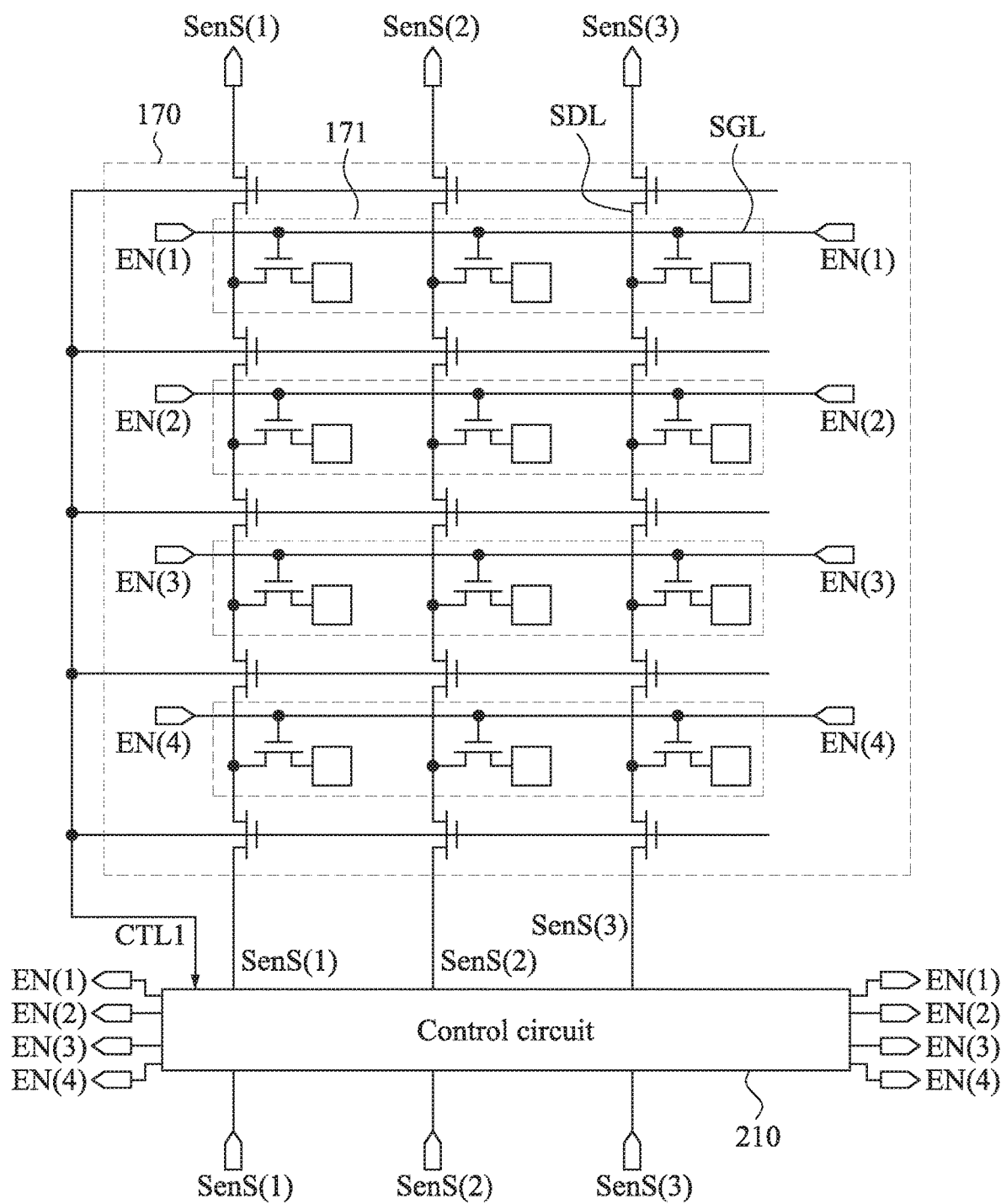
FIG. 2D is a schematic diagram of the first sensing matrix according to a third embodiment of the present disclosure.

Reference is made to FIG. 2C and FIG. 2D. FIG. 2C is a schematic diagram of the first sensing matrix 170 according to a second embodiment of the present disclosure, and FIG. 2D is a schematic diagram of the first sensing matrix 170 according to a third embodiment of the present disclosure. In another embodiment, if the switch number of the switch unit 172 affects the number of wire, it will be caused the resistance and capacitance loading (RC loading) of the wires increasing. Therefore, the switch number of the switch unit 172 can be reduced by adjusting the number of the sensing units 1711 in the grid units 171. As shown in FIG. 2C, for example, the grid units 171 includes four sensing units 1711, and there are twelve sensing units 1711. However, the switch unit 172 only in the column direction, in other words, there are the first switches 1721 in the column direction. When the first switches 1721 are conducted by the controlling signal CTL1, the first switches 1721 are configured to transmit the enable signal EN to the sensing units 1711 to conduct the switch 1712 via the sensing gate lines SGL, and then the sensing signal SenS sensed by sensing electrode 1713 is transmitted to the control circuit 210 via the sensing data lines SDL.

Afterwards, as shown in FIG. 2D, for example, the grid units 171 includes three sensing units 1711, and there are twelve sensing units 1711. However, the switch unit 172 only in the row direction, in other words, there are the second switches 1722 in the row direction. When the second switches 1722 are conducted by the controlling signal CTL1, the second switches 1722 are configured to transmit the enable signal EN to the sensing units 1711 to conduct the switch 1712 via the sensing gate lines SGL, and then the sensing signal SenS sensed by sensing electrode 1713 is transmitted to the control circuit 210 via the second switches 1722 and the sensing data lines SDL. Therefore, the switch number of the switch unit 172 can be reduced according to the embodiments shown in FIG. 2C and FIG. 2D. It is capable of still executing aforesaid operation and decreasing the resistance and capacitance loading of the wires.

Figure 2E:
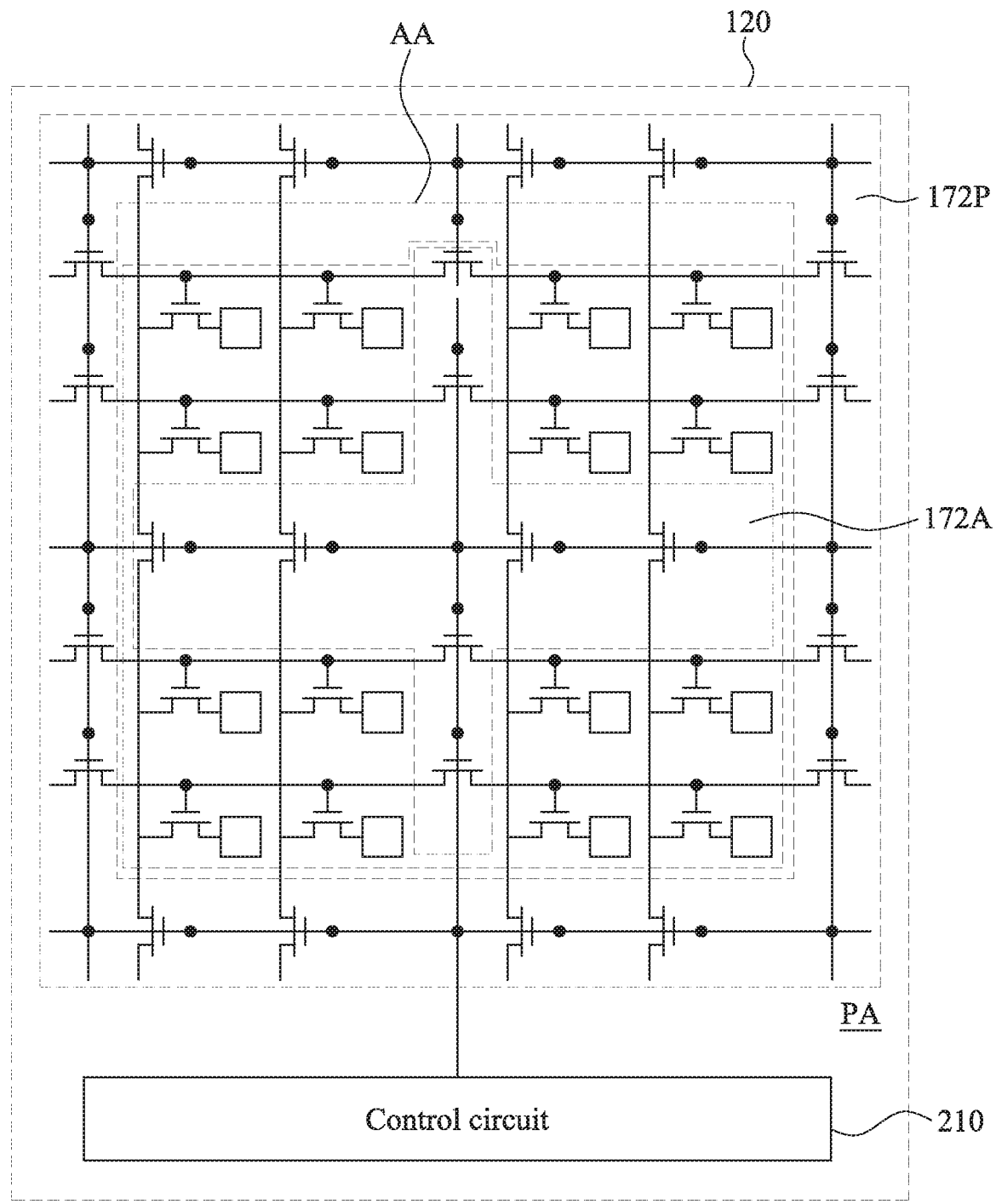
FIG. 2E is a schematic diagram of the first sensing matrix according to a fourth embodiment of the present disclosure.

Reference is made to FIG. 2E. FIG. 2E is a schematic diagram of the first sensing matrix 170 according to a fourth embodiment of the present disclosure. In another embodiment, as shown in FIG. 2E, the switch unit 172 has a part of the switches 172A located in the display area AA, and another part of the switches 172P located in the peripheral area PA. In this case, the switches 172P are located in the peripheral area PA to increase the space in the display area AA, and improve the resolution of the sensing units 1711. In another embodiment, the switches of the switch unit 172 also can be located in the display area AA. However, the disclosure is not limited thereto.

Figure 3A:
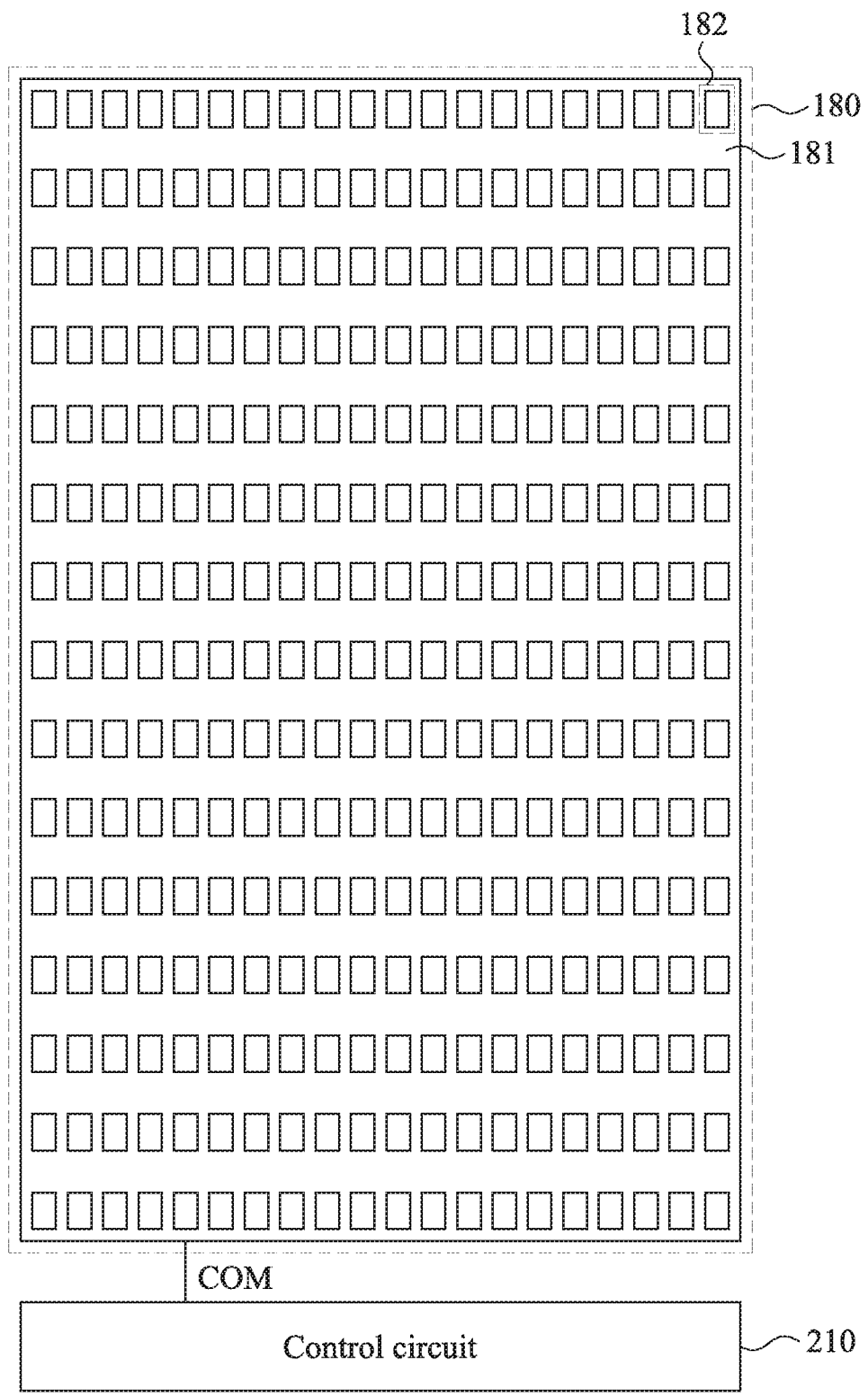
FIG. 3A is a schematic diagram of the second sensing matrix according to a first embodiment of the present disclosure.

Reference is made to FIG. 3A. FIG. 3A is a schematic diagram of the second sensing matrix 180 according to a first embodiment of the present disclosure. As shown in FIG. 3A, the second sensing matrix 180 includes a common electrode 181 and a plurality of opening units 182. The second sensing matrix 180 is configured to receive a common signal COM. The second sensing matrix 180 can be implemented as indium tin oxide (ITO). To improve the transparency of the display panel, the opening units 182 of the second sensing matrix 180 overlaps with an open area of the pixel circuit in a vertical projection direction of the substrate 120.

Figure 3B:
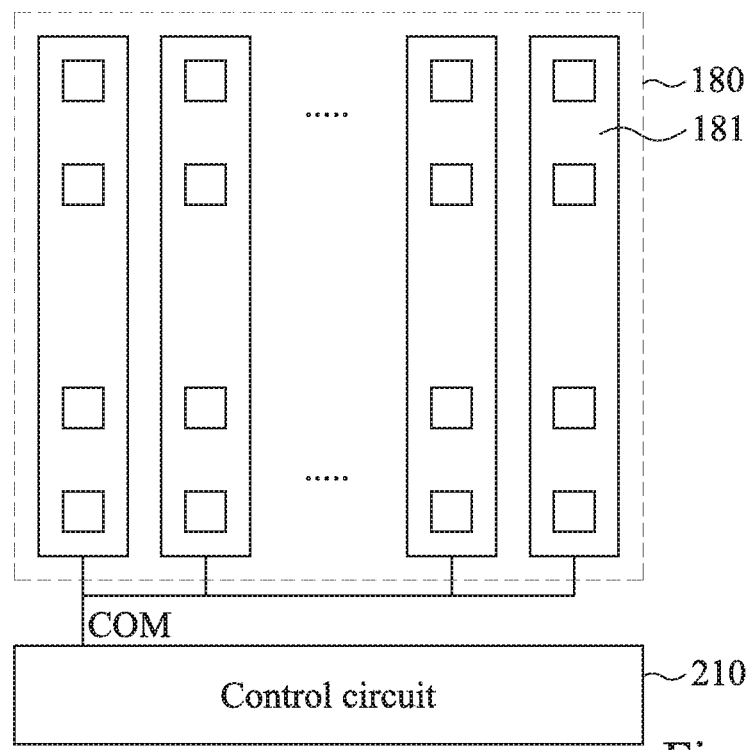
FIG. 3B is a schematic diagram of the second sensing matrix according to a second embodiment of the present disclosure.
Figure 3C:
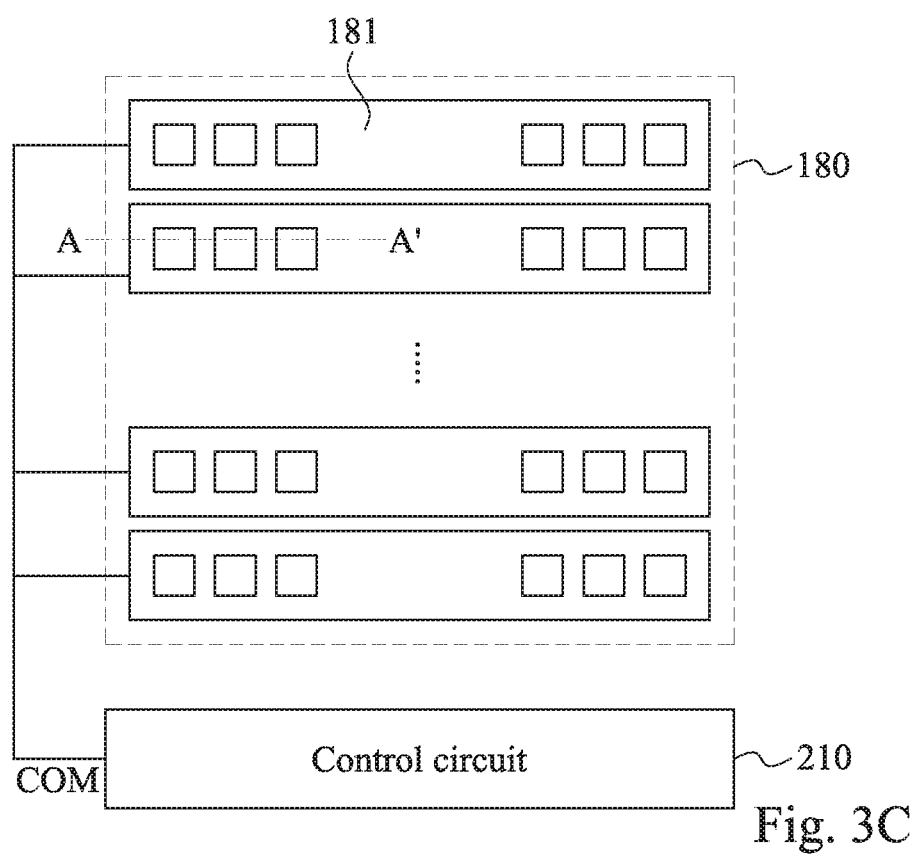
FIG. 3C is a schematic diagram of the second sensing matrix according to a third embodiment of the present disclosure.

Reference is made to FIG. 3B and FIG. 3C. FIG. 3B is a schematic diagram of the second sensing matrix 180 according to a second embodiment of the present disclosure, and FIG. 3C is a schematic diagram of the second sensing matrix 180 according to a third embodiment of the present disclosure. In another embodiment, to decrease the interference effect between signal of the second sensing matrix 180 and signal on the sensing data lines SDL or the sensing gate lines SGL, the second sensing matrix 180 can be split into different parts in the column direction or the row direction. As shown in FIG. 3B, the second sensing matrix 180 is split into different parts in the column direction, and they are utilized the wire outside the display area AA to connect with each other. The wire is configured to receive the common signal COM. Similarly, as shown in FIG. 3C, the second sensing matrix 180 is split into different parts in the row direction, and they are utilized the wire outside the display area AA to connect with each other. The wire is configured to receive the common signal COM.

Figure 4A:
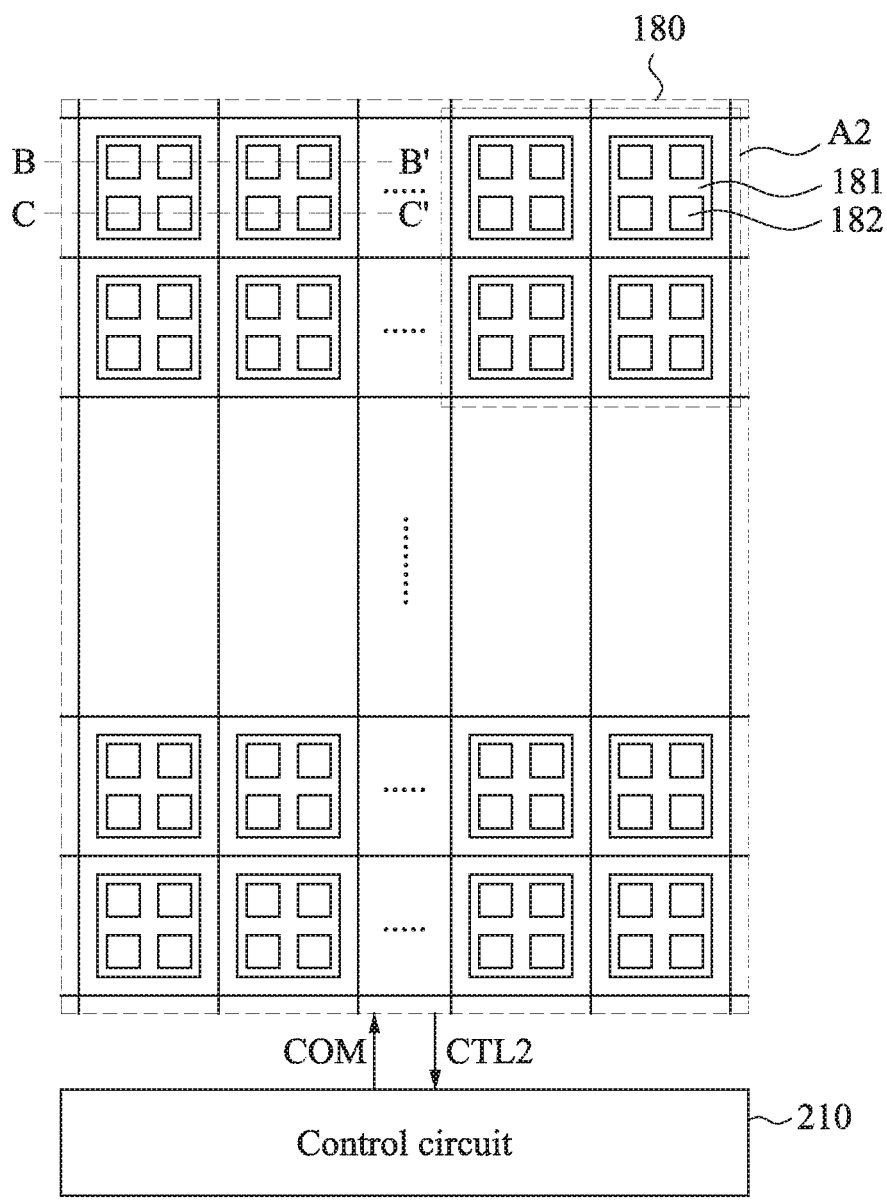
FIG. 4A is a schematic diagram of the second sensing matrix according to a fourth embodiment of the present disclosure.

Reference is made to FIG. 4A, which is a schematic diagram of the second sensing matrix 180 according to a fourth embodiment of the present disclosure. In another embodiment, as shown in FIG. 4A, the second sensing matrix 180 includes a plurality of common electrodes 181, a plurality of opening units 182, and a switch unit 183 (not shown in FIG. 4A). Wherein, the second sensing matrix 180 is configured to receive a controlling signal CTL2 and the common signal COM.

Figure 4B:
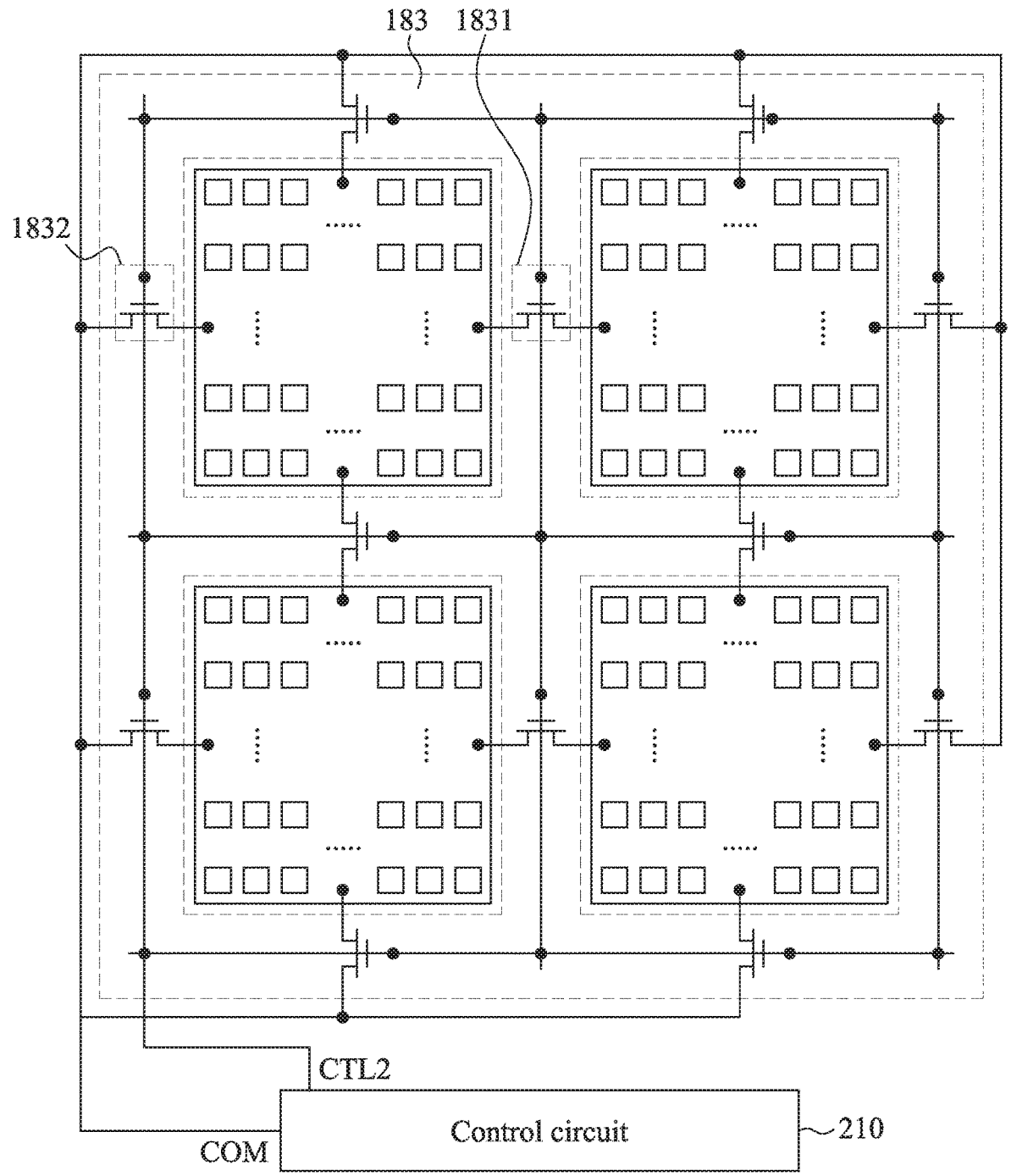
FIG. 4B is a partially enlarged schematic diagram illustrating the area A2 of the FIG. 4A according to one embodiment of the present disclosure.

Reference is made to FIG. 4B, which is a partially enlarged schematic diagram illustrating the area A2 of the FIG. 4A according to one embodiment of the present disclosure. As the embodiment shown in FIG. 4B, the area A2 171 includes four common electrodes 181, and the common electrodes 181 include a plurality of opening units 182. However, the disclosure is not limited thereto. Wherein, the opening units 182 are substantially overlap with the pixel units. As shown in FIG. 4B, the switch unit 183 includes twelve switches, and the twelve switches are split two types of switch. One type of switch is electrically connected between two adjacent common electrodes 181. With respect to the switch 1831 as an example, a first end of the switch 1831 is electrically connected to the common electrode 181; a second end of the switch 1831 is electrically connected to another common electrode 181, and a control end of the switch 1831 is configured to receive the controlling signal CTL2 from the control circuit 210.

Afterwards, with respect to the switch 1832 (another type of switch) as an example, a first end of the switch 1832 is electrically connected to the common electrode 181; a second end of the switch 1831 is configured to receive the common signal COM from the control circuit 210, and a control end of the switch 1832 is configured to receive the controlling signal CTL2 from the control circuit 210. When the switch unit 183 is conducted according to the controlling signal CTL2, the second sensing matrix 180 can be realized as an electrode layer. In this time period, if the touch pressure changes, the gap of the liquid crystal layer (Cell gap) between the second sensing matrix 180 and the touch sensing matrix 140 is changed, and then the capacitance value is changed. Therefore, it can achieve the effect of force touch.

Figure 4C:
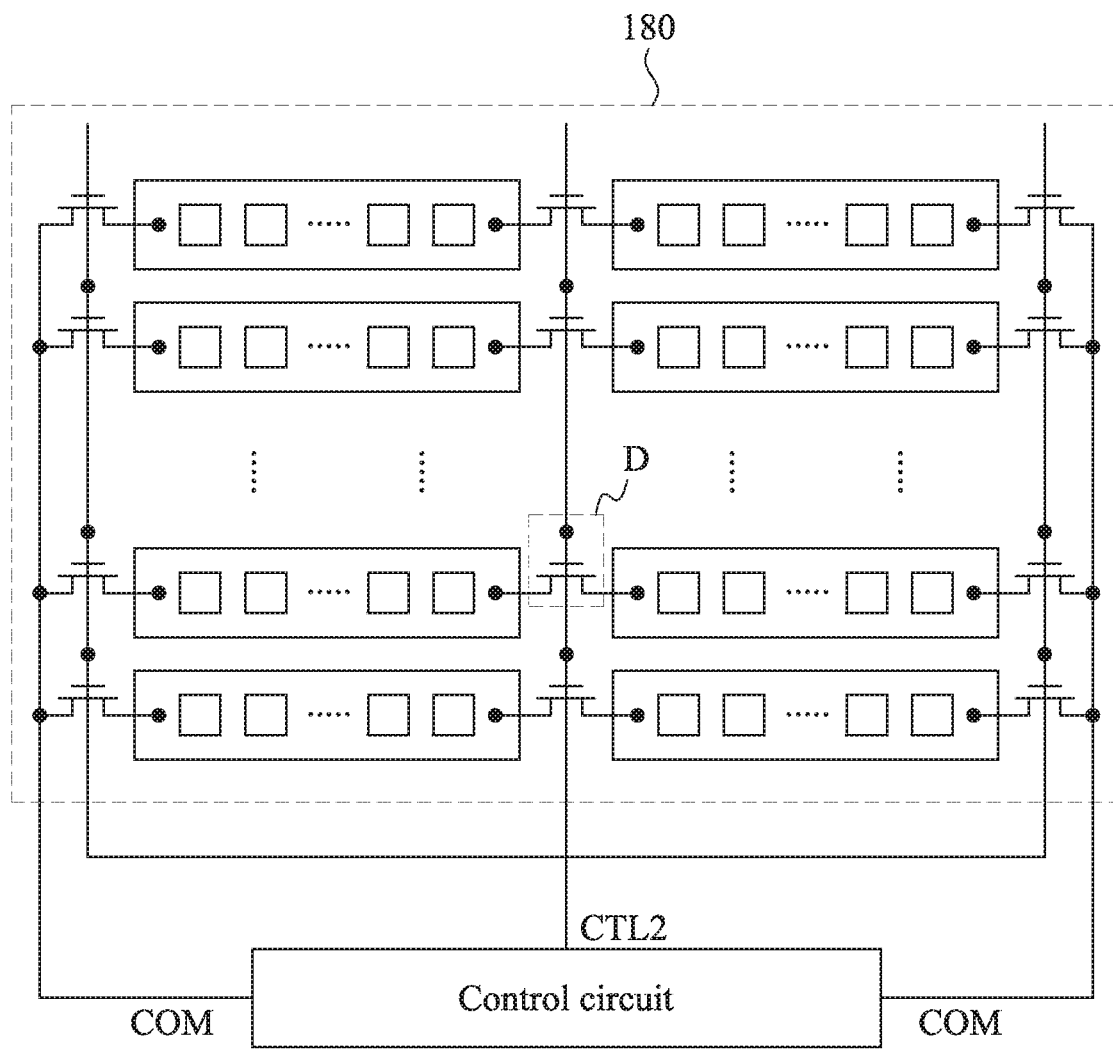
FIG. 4C is a schematic diagram of the second sensing matrix according to a fifth embodiment of the present disclosure.
Figure 4D:
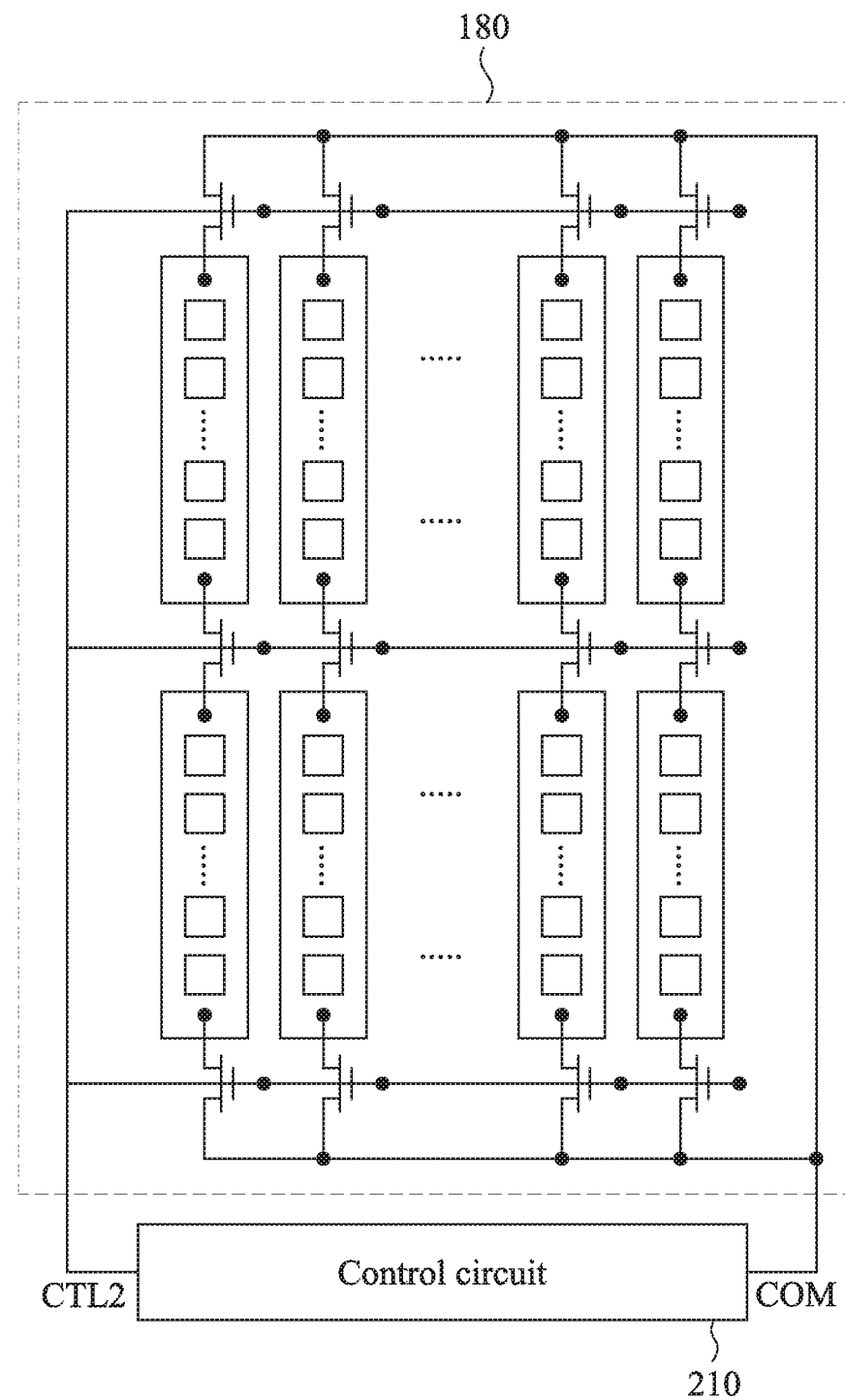
FIG. 4D is a schematic diagram of the second sensing matrix according to a sixth embodiment of the present disclosure.

Reference is made to FIG. 4C and FIG. 4D. FIG. 4C is a schematic diagram of the second sensing matrix 180 according to a fifth embodiment of the present disclosure, and FIG. 4D is a schematic diagram of the second sensing matrix 180 according to a sixth embodiment of the present disclosure. In another embodiment, if the switch number of the switch unit 183 affects the number of wire, it will be caused the resistance and capacitance loading (RC loading) of the wires increasing. Therefore, the number of wire can be reduced by adjusting the switch number of the switch unit 183. As shown in FIG. 4C, for example, the common electrode 181 can be split into different parts in two columns and several rows. In other words, there is the switch unit 183 in the column direction. When the switch unit 183 is conducted by the controlling signal CTL2, the switch unit 183 is configured to transmit the common signal COM to the common electrode 181 via the wire. Similarly, as shown in FIG. 4D, the common electrode 181 is split into different parts in two rows and several columns. In other words, there is the switch unit 183 in the row direction. When the switch unit 183 is conducted by the controlling signal CTL2, the switch unit 183 is configured to transmit the common signal COM to the common electrode 181 via the wire.

Figure 4E:
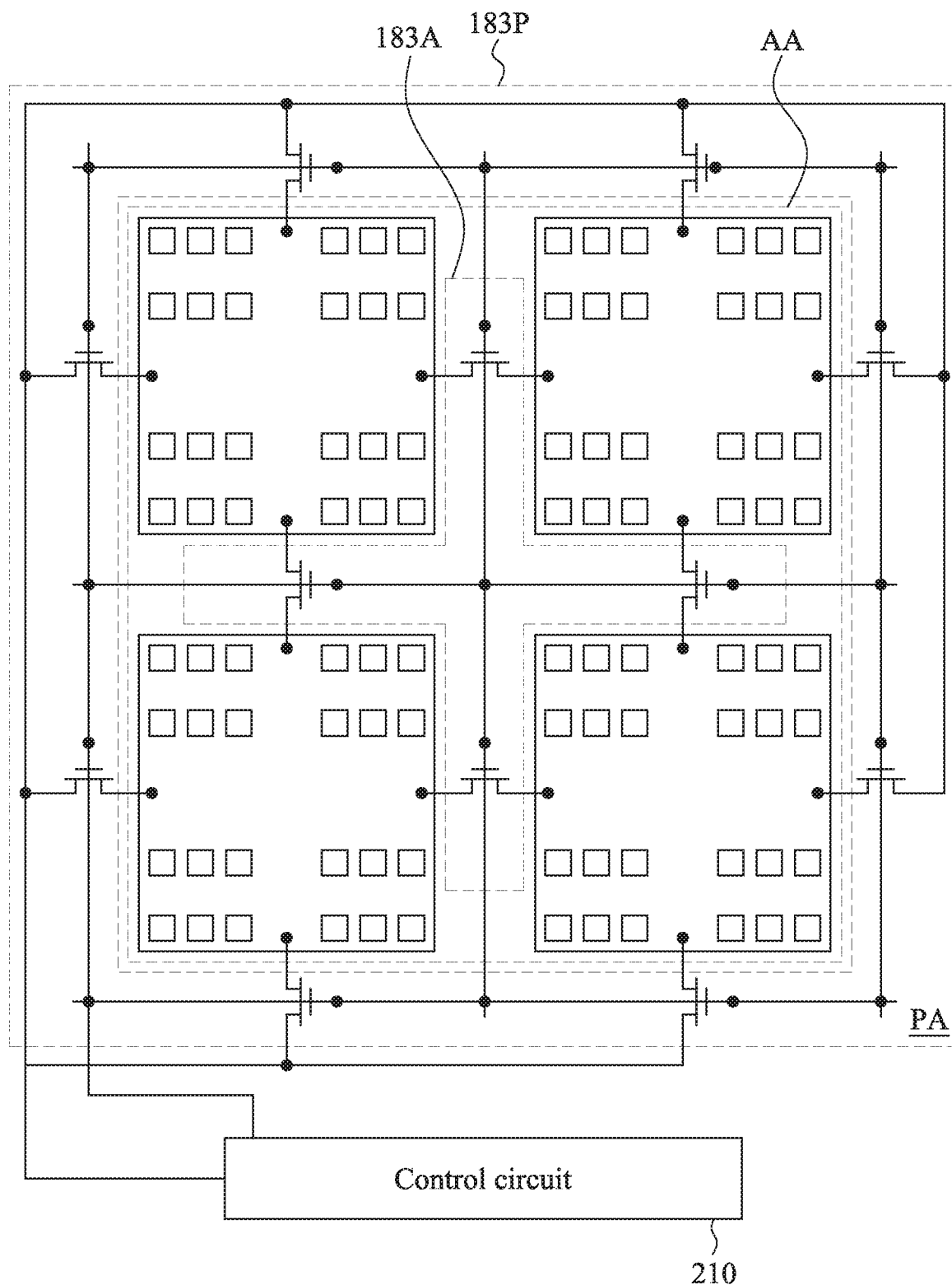
FIG. 4E is a schematic diagram of the second sensing matrix according to a seventh embodiment of the present disclosure.

Reference is made to FIG. 4E, which is a schematic diagram of the second sensing matrix 180 according to a seventh embodiment of the present disclosure. As shown in FIG. 4E, the switch unit 183 has a part of the switches 183A located in the display area AA, and another part of the switches 183P located in the peripheral area PA. In this case, the switches 183P are located in the peripheral area PA to increase the space in the display area AA, and improve the number of the opening units 182. At the same time, with the embodiment of FIG. 2E described above, the resolution of the sensing unit 1711 can be improved. In another embodiment, the switches of the switch unit 183 also can be located in the display area AA. However, the disclosure is not limited thereto.

Figure 5A:
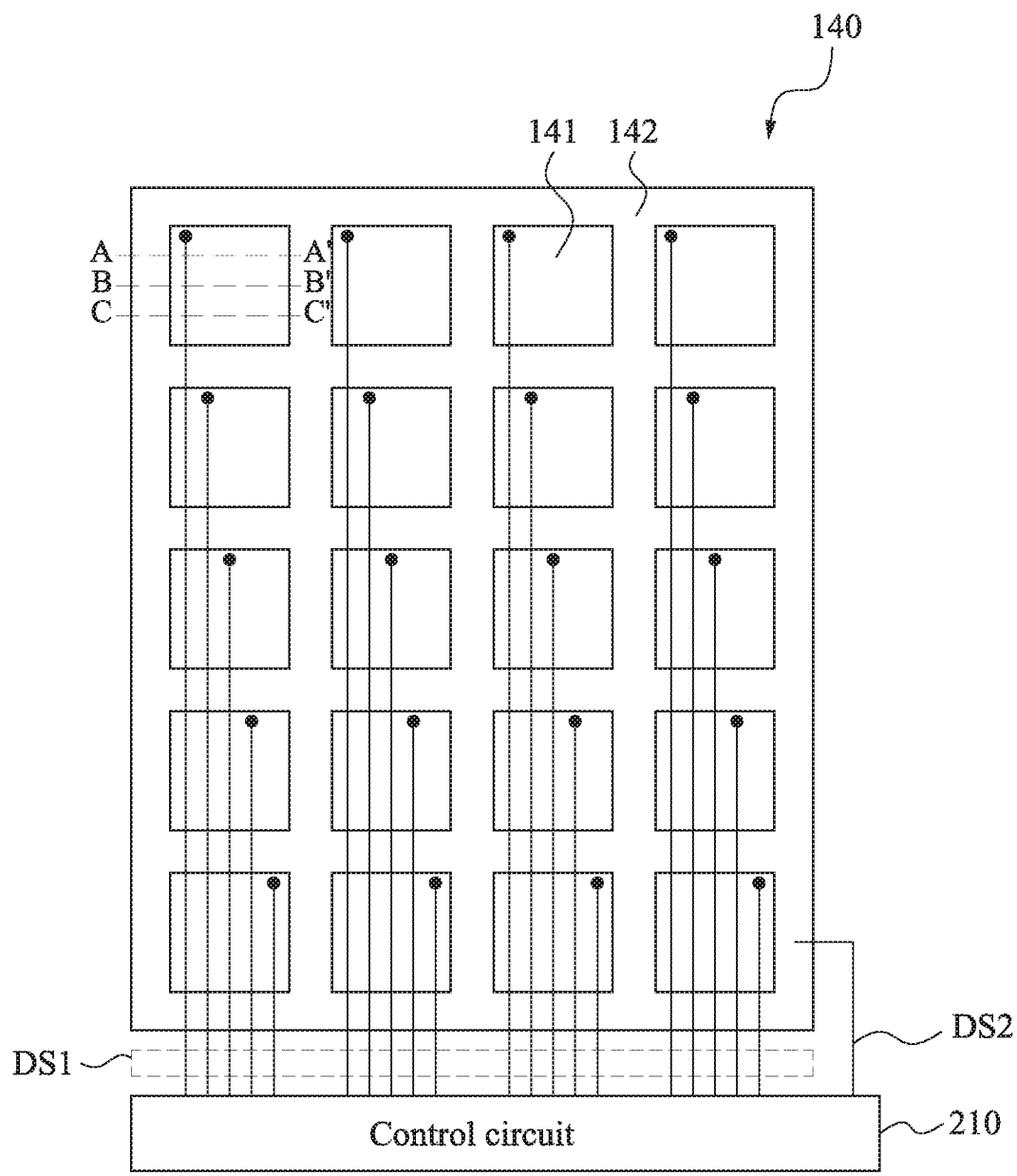
FIG. 5A is a schematic diagram of the touch sensing matrix according to a first embodiment of the present disclosure.

Reference is made to FIG. 5A, which is a schematic diagram of the touch sensing matrix 140 according to a first embodiment of the present disclosure. As shown in FIG. 5A, the touch sensing matrix 140 includes a plurality of touch electrodes 141 and a touch common electrode 142, and wherein the touch common electrode 142 is electrically insulated from the touch electrodes 141 and the touch common electrode 142 substantially surrounds the touch sensing matrix 140. The touch electrodes 141 and the touch common electrode 142 are electrically connected to the control circuit 210, respectively. The touch electrodes 141 are arranged in matrix. Wherein, the one side of the substrate 110 is opposite to one side of the substrate 120, and the touch common electrode 142 can be implemented as a mesh metal electrode or indium tin oxide (ITO). The control circuit 210 is configured to transmit a first driving signal DS1 to the touch electrodes 141 and transmit a second driving signal DS2 to the touch common electrode 142. In the embodiment, the first driving signal DS1 can be implemented as a common voltage signal or touch signal, and the second driving signal DS2 can be implemented as a common voltage signal or touch synchronous driving signal.

Figure 5B:
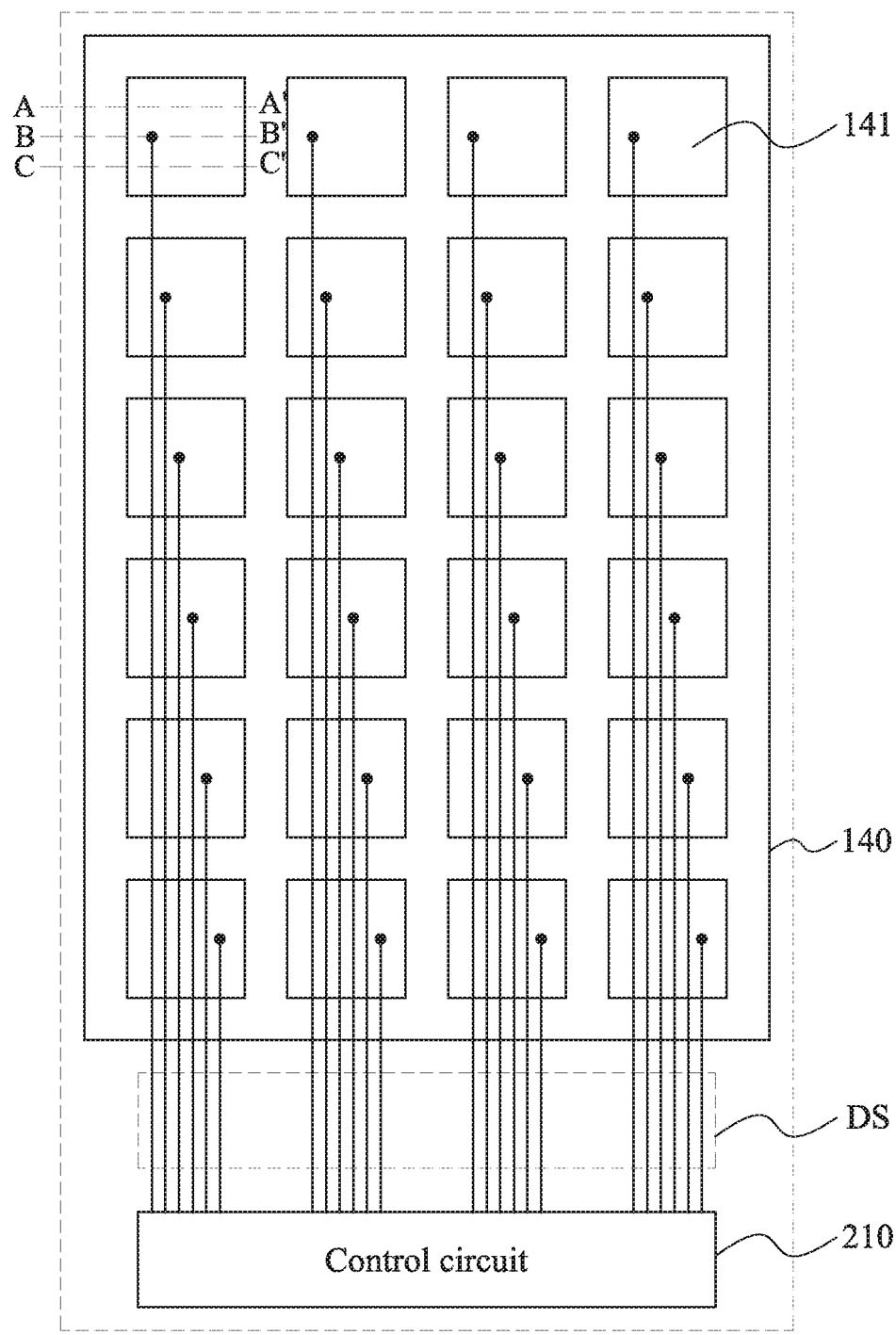
FIG. 5B is a schematic diagram of the touch sensing matrix according to a second embodiment of the present disclosure.

Reference is made to FIG. 5B, which is a schematic diagram of the touch sensing matrix 140 according to a second embodiment of the present disclosure. In another embodiment, as shown in FIG. 5B, the touch sensing matrix 140 includes a plurality of touch electrodes 141, and wherein the touch electrodes are electrically connected to the control circuit 210, respectively. The touch electrodes 141 are arranged in matrix. The control circuit 210 is configured to transmit a driving signal DS to the touch electrodes 141, respectively. The first driving signal DS can be implemented as a common voltage signal or touch signal.

Figure 6A:
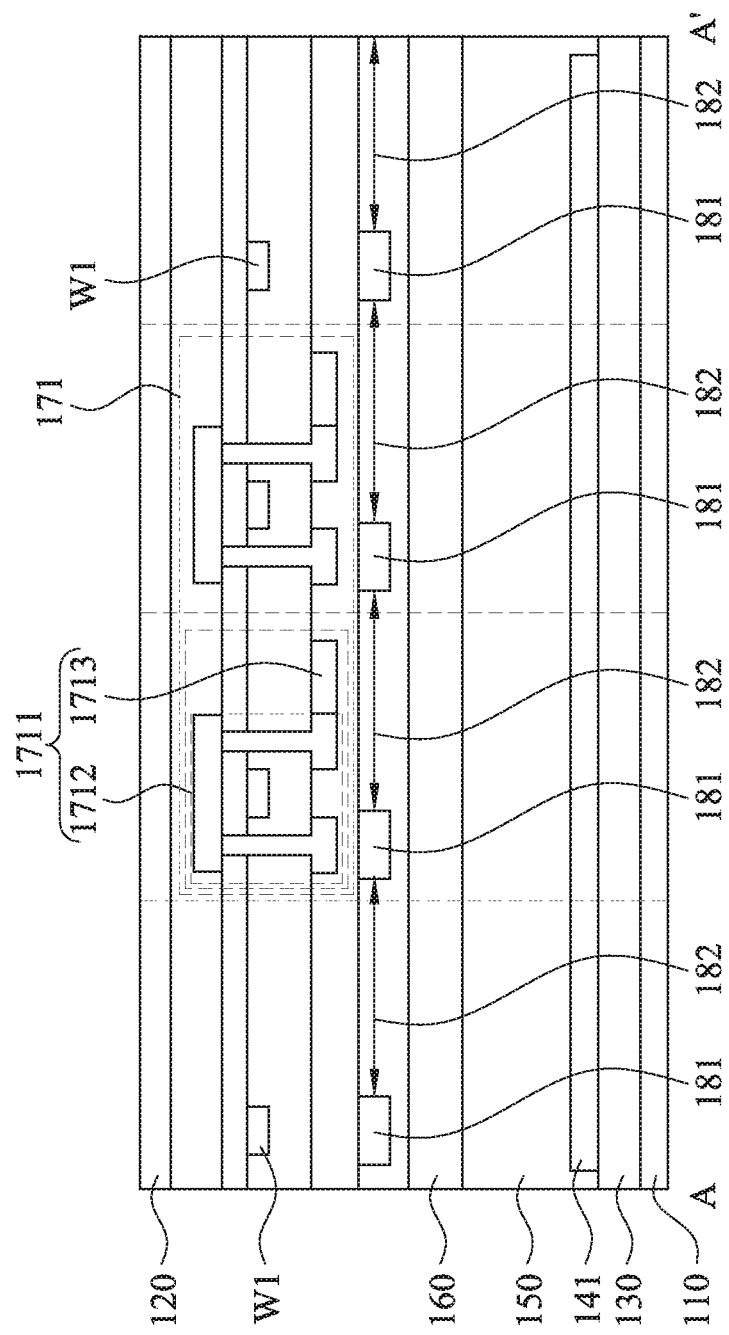
FIG. 6A is a simplified cross-sectional view along line AA' in FIGS. 2A, 3C, and 5B according to an embodiment of the present disclosure.

Afterwards, reference is made to FIG. 6A, which is a simplified cross-sectional view along line AA' in FIGS. 2A, 3C, and 5B according to an embodiment of the present disclosure. As shown in FIG. 6A, the grid units 171 includes two sensing units 1711, the grid units 171 is disposed between the substrate 120 and the second sensing matrix 180. Wherein, the sensing electrode 1713 substantially corresponds to the opening units 182, and the switch 1712 substantially corresponds to the common electrode 181. The color filter layer 160 is disposed between the second sensing matrix 180 and the display medium 150. One touch electrode 141 substantially corresponds to two grid units 171 in the direction of the line AA'. Therefore, a vertical projection of the touch electrode 141 on the one side of the substrate 110 is larger than a vertical projection of the grid unit 171 on the one side of the substrate 110. The vertical projection of the touch electrode 141 on the one side of the substrate 110 substantially overlaps a vertical projection of the grid unit 171 and the switch unit 172 (shown in FIG. 6C) on the one side of the substrate 110, and the wire W1 of the switch unit 172 substantially corresponds to the common electrode 181.

Figure 6B:
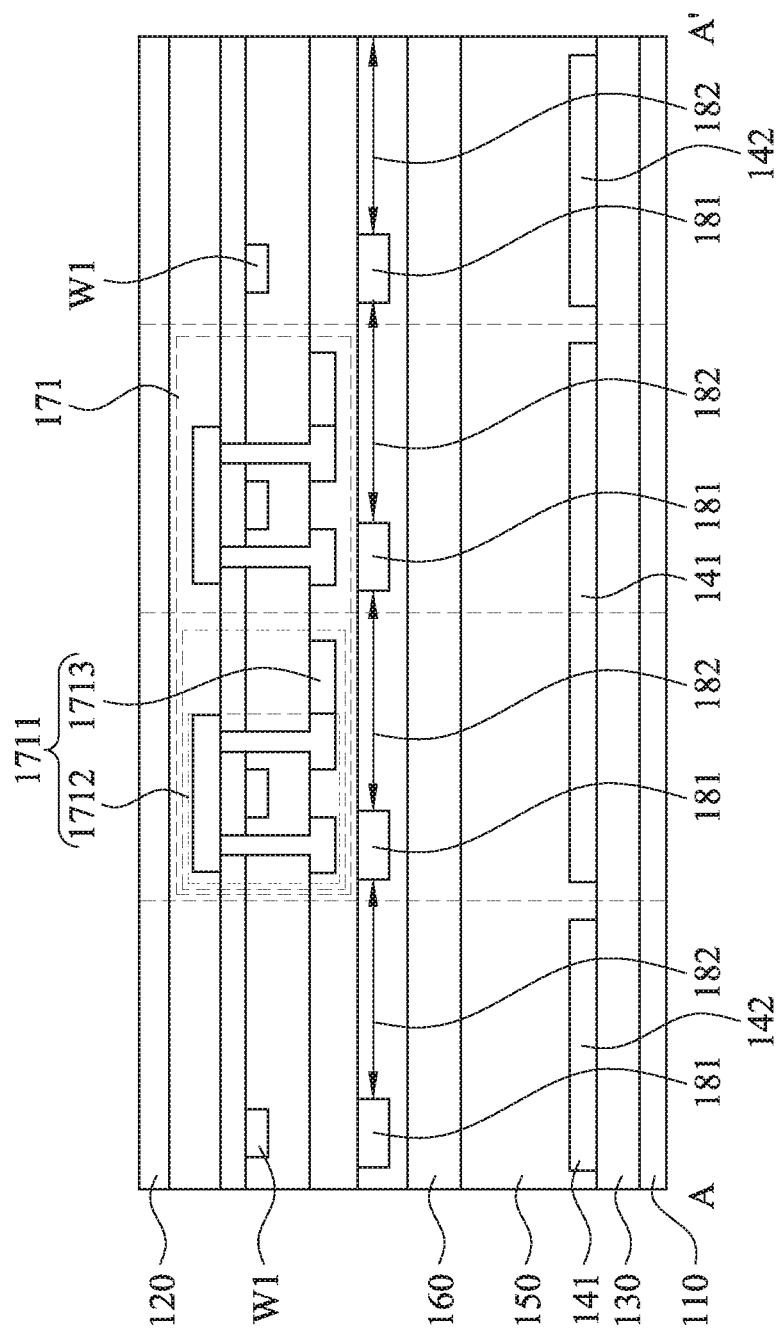
FIG. 6B is a simplified cross-sectional view along line AA' in FIGS. 2A, 3C, and 5A according to an embodiment of the present disclosure.

Afterwards, reference is made to FIG. 6B, which is a simplified cross-sectional view along line AA' in FIGS. 2A, 3C, and 5A according to an embodiment of the present disclosure. The cross-sectional view of the touch display panel 100 shown in FIG. 6B is similar with the touch display panel 100 shown in FIG. 6A, the difference is the touch common electrode 142. As shown in FIG. 6B, one touch electrode 141 substantially corresponds to two grid units 171 in the direction of the line AA'. Therefore, the vertical projection of the touch electrode 141 on the one side of the substrate 110 substantially overlaps the vertical projection of the grid unit 171 on the one side of the substrate 110. A vertical projection of the touch common electrode 142 on the one side of the substrate 110 substantially overlaps a vertical projection of the switch unit 172 (shown in FIG. 6F) on the one side of the substrate 110.

Afterwards, it is noticed that the line AA' in FIG. 6A is corresponding to two grid units 171 in FIG. 2A, three opening units 182 in FIG. 3C, and one touch electrodes 141 in FIG. 5B, and then the line AA' in FIG. 6B is corresponding to two grid units 171 in FIG. 2A, three opening units 182 in FIG. 3C, and one touch electrodes 141 in FIG. 5A. The correspondence is only an exemplary embodiment of the correspondence between the grid units 171, the opening units 182, and the touch electrodes 141, and however, the disclosure is not limited thereto.

Figure 6C:
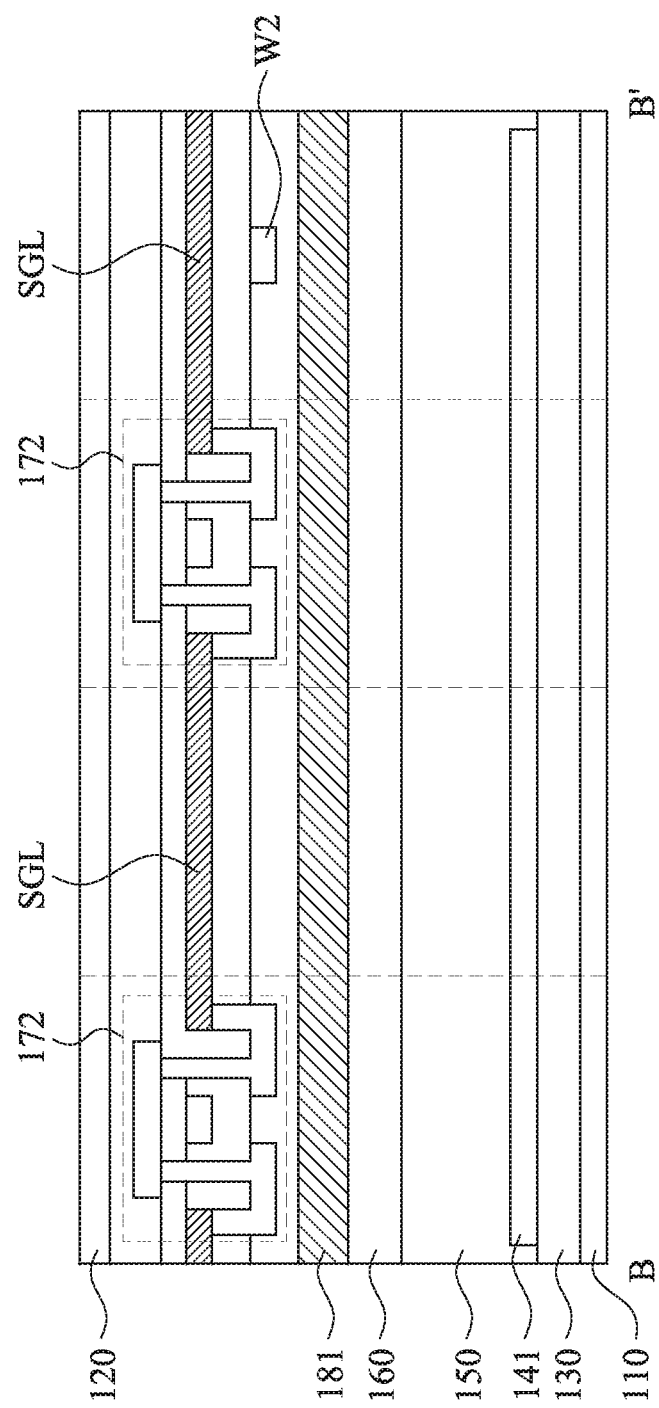
FIG. 6C is a simplified cross-sectional view along line BB' in FIGS. 2A, 4A, and 5B according to an embodiment of the present disclosure.
Figure 6D:
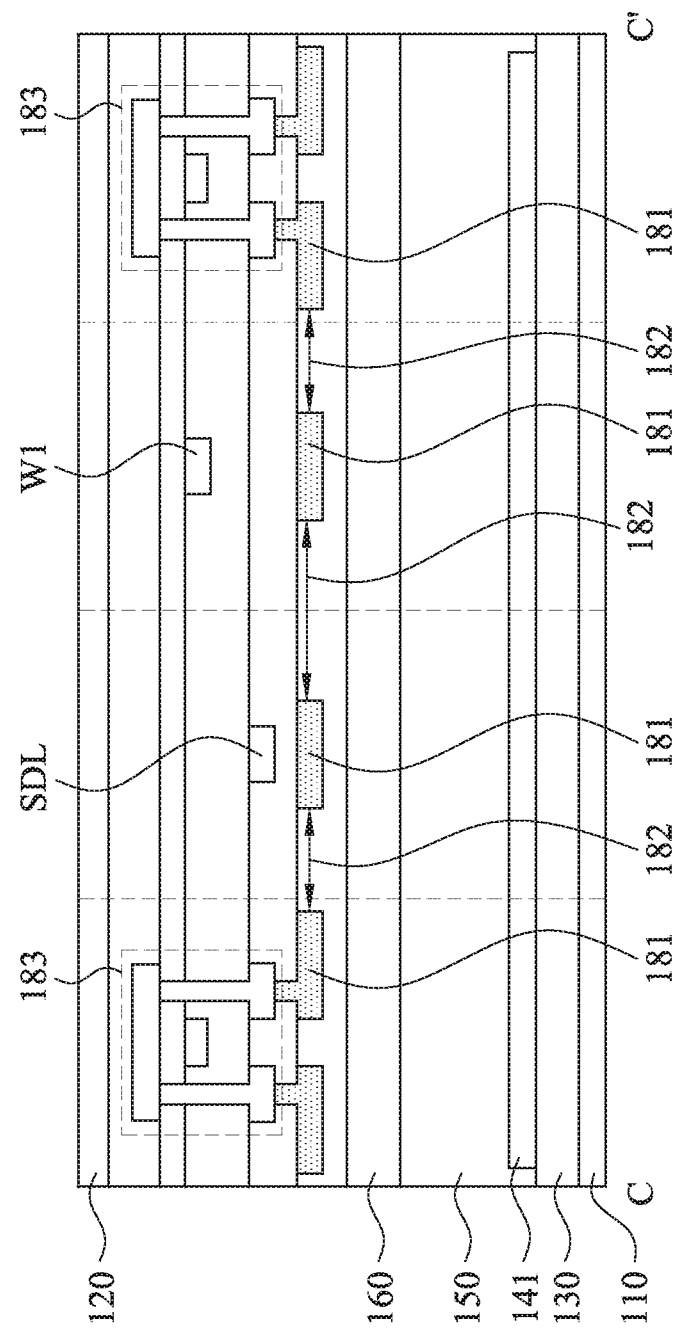
FIG. 6D is a simplified cross-sectional view along line CC' in FIGS. 2A, 4A, and 5B according to an embodiment of the present disclosure.

Afterwards, reference is made to FIG. 6C and FIG. 6D. FIG. 6C is a simplified cross-sectional view along line BB' in FIGS. 2A, 4A, and 5B according to an embodiment of the present disclosure, and FIG. 6D is a simplified cross-sectional view along line CC' in FIGS. 2A, 4A, and 5B according to an embodiment of the present disclosure. The cross-sectional view of the touch display panel 100 shown in FIG. 6C is similar with the touch display panel 100 shown in FIG. 6A, the difference is the second sensing matrix 180. It is noticed that the line BB' is along the sensing gate line SGL in FIG. 2B. As shown in FIG. 6C, the switch unit 172 is disposed between the substrate 120 and the second sensing matrix 180. One end of the switch unit 172 is electrically connected to the sensing gate line SGL, and another end of the switch unit 172 is electrically connected to the sensing gate line SGL. Wherein, the wire W2 is configured to transmit the controlling signal CTL2 of the switch unit 183 shown in FIG. 4C.

Afterwards, please refer to the line CC' shown in FIG. 6D. The switch unit 183 is disposed between the substrate 120 and the second sensing matrix 180. One end of the switch unit 183 is electrically connected to the common electrode 181, and another end of the switch unit 183 is electrically connected to the common electrode 181. Wherein, the wire W1 is configured to transmit the controlling signal CTL1 of the switch unit 172 shown in FIG. 2B, and a vertical projection of the sensing data line SDL on the one side of the substrate 110 substantially overlaps a vertical projection of the common electrode 181 on the one side of the substrate 110. Afterwards, the switch unit 183 of the second sensing matrix 180 is disposed on the same layer as the switch unit 172 of the first sensing matrix 170. Two ends of the switch unit 172 are electrically connected to the sensing gate line SGL, respectively, and two ends of the switch unit 183 are electrically connected to the common electrode 181, respectively.

Afterwards, it is notice that the line BB' in FIG. 6C is corresponding to two grid units 171 in FIG. 2A, four opening units 182 in FIG. 4A, and one touch electrodes 141 in FIG. 5B, and then the line CC' in FIG. 6D is corresponding to two grid units 171 in FIG. 2A, four opening units 182 in FIG. 4A, and one touch electrodes 141 in FIG. 5B. The correspondence is only an exemplary embodiment of the correspondence between the grid units 171, the opening units 182, and the touch electrodes 141, and however, the disclosure is not limited thereto.

Reference is made to FIG. 6E. FIG. 6E is a simplified cross-sectional view along wire in the area D of FIG. 4C according to an embodiment of the present disclosure. In the embodiment shown in FIG. 6E, the area D is shown that the connection manner of the wire W2, which is transmitted the controlling signal CTL2 of the switch unit 183. The wire W2 is disposed on a lower surface of the insulated layer L1. In order to connect the gate end of the switch unit 183, there are through holes H1 and H2 in the insulated layer L1, and the wire W2 is configured to pass through the insulated layer L1 to reach the upper surface of the insulating layer L1 via the through hole H1, and the wire W1 is also disposed on the upper surface of the insulating layer L1. Then, the wire W2 is configured to cross the transistor of the switch unit 183 reach the lower surface of the insulating layer L1 via the through hole H2. Wherein, a vertical projection of the wire W2 on the one side of the substrate 110 substantially overlaps the vertical projection of the common electrode 181 on the one side of the substrate 110. It is noticed that the transistor is not shown in FIG. 6E, and only shown that the connection manner, which is connected the gate end of the transistor.

Figure 6F:
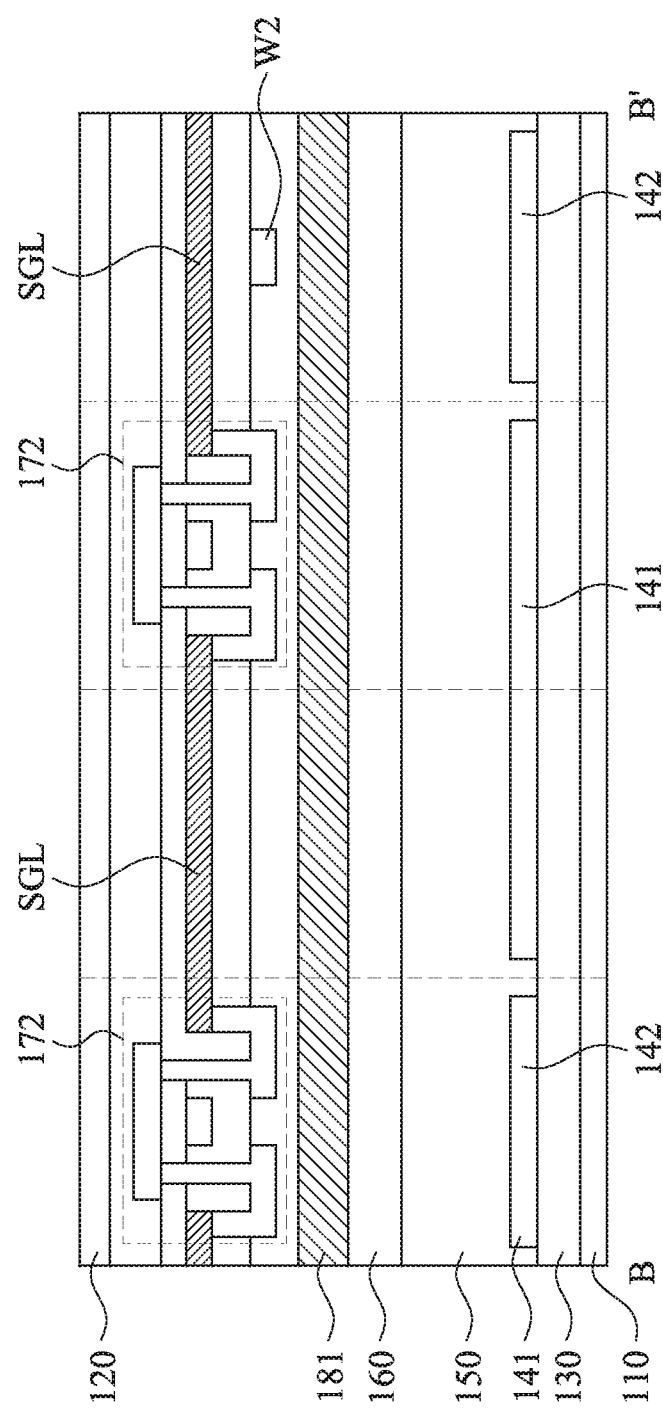
FIG. 6F is a simplified cross-sectional view along line BB' in FIGS. 2A, 4A, and 5A according to an embodiment of the present disclosure.
Figure 6G:
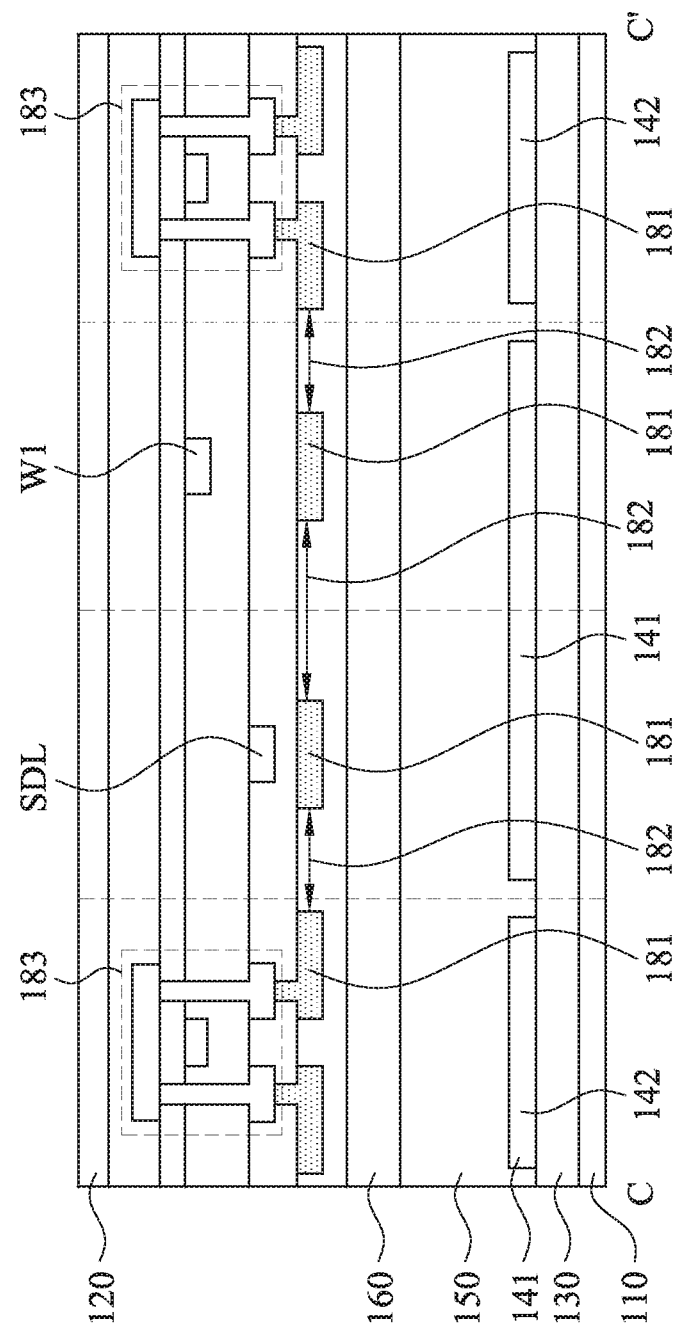
FIG. 6G is a simplified cross-sectional view along line CC' in FIGS. 2A, 4A, and 5A according to an embodiment of the present disclosure.

Afterwards, reference is made to FIG. 6F and FIG. 6G. FIG. 6F is a simplified cross-sectional view along line BB' in FIGS. 2A, 4A, and 5A according to an embodiment of the present disclosure, and FIG. 6G is a simplified cross-sectional view along line CC' in FIGS. 2A, 4A, and 5A according to an embodiment of the present disclosure. The cross-sectional view of the touch display panel 100 shown in FIG. 6C is similar with the touch display panel 100 shown in FIG. 6F and FIG. 6G, the difference is the touch common electrode 142. As shown in FIG. 6F and FIG. 6G, a vertical projection of the touch common electrode 142 on the one side of the substrate 110 substantially overlaps the vertical projection of the switch unit 172 on the one side of the substrate 110, and the vertical projection of the touch common electrode 142 on the one side of the substrate 110 substantially overlaps the vertical projection of the switch unit 183 on the one side of the substrate 110.

Afterwards, it is noticed that the line BB' in FIG. 6F is corresponding to two grid units 171 in FIG. 2A, four opening units 182 in FIG. 4A, and one touch electrodes 141 in FIG. 5B, and then the line CC' in FIG. 6G is corresponding to two grid units 171 in FIG. 2A, four opening units 182 in FIG. 4A, and one touch electrodes 141 in FIG. 5A. The correspondence is only an exemplary embodiment of the correspondence between the grid units 171, the opening units 182, and the touch electrodes 141, and however, the disclosure is not limited thereto.

Afterwards, reference is made to FIG. 7A, which is a timing diagram illustrating the driving signal of the touch display panel according to a first embodiment of this disclosure. In the embodiment, in the display stage TP1, a gate driving signal G(n) switches to an enable level VGH. In this stage, the first driving signal DS1, the second driving signal DS2 and the common signal COM remain at a first voltage level V1, and wherein the first voltage level V1 can be implemented as a common voltage level provided from the control circuit 210. The controlling signal CTL1 switches to the enable level VGH to conduct the switch unit 172. However, in the display stage TP1, if the enable signal EN remains at a disable level VGL, the sensing signal SenS remains at a low voltage level V2.

Afterwards, in the touch sensing stage TP2, the gate driving signal G(n) switches to the disable level VGL. In this stage, the first driving signal DS1 and the second driving signal DS2 remain at a high voltage level VH, and wherein the high voltage level VH is between the enable level VGH and the first voltage level V1. The controlling signal CTL1 switches to the disable level VGL to switch off the switch unit 172, and at this time, the first sensing matrix 170 is in a floating state. The sensing signal SenS and the enable signal EN are coupled to a couple voltage level VC, and the same time, the control circuit 210 is configured to transmit the synchronization signal synchronized with the first driving signal DS1 and the second driving signal DS2 to the second sensing matrix 180, and thus the common signal COM remains at the high voltage level VH.

Afterwards, because the first sensing matrix 170 is in the floating state and the second sensing matrix 180 receives the synchronization signal synchronized with the touch sensing matrix 140, in the touch sensing stage TP2, there has not the parasitic capacitance generated between the first sensing matrix 170, the second sensing matrix 180 and the touch sensing matrix 140. Thus, the effect of the resistance and capacitance loading will be decreased. At the same time, the touch signal of the touch sensing matrix 140 can be coupled to the outside via the floating first sensing matrix 170, and thus it can maintain the original touch effect and avoid signal shielding.

Afterwards, in the fingerprint sensing stage TP3, the first driving signal DS1 and the second driving signal DS2 remain at the first voltage level V1. The controlling signal CTL1 switches to the enable level VGH to conduct the switch unit 172, and at this time, the enable signal EN remains at the enable level VGH. Then, the sensing electrode 1713 is configured to output the sensing signal SenS, and in this time the sensing signal SenS remains the high voltage level VH.

In another embodiment, the fingerprint sensing stage TP3 can be combined with the display stage TP1, and thus the touch display panel 100 can also performs fingerprint sensing while displaying. Reference is made to FIG. 7B, which is a timing diagram illustrating the driving signal of the touch display panel according to a second embodiment of this disclosure. The timing diagram of the touch display panel 100 shown in FIG. 7B is similar with the timing diagram shown in FIG. 7A, the difference is that the touch display panel 100 can also performs fingerprint sensing while displaying. As shown in FIG. 7B, the sensing signal SenS remains at the high voltage level VH and the enable signal EN remains at the enable level VGH in this stage. In the embodiment, the operation of other signals is similar with the operation of the first embodiment. For the sake of brevity; those descriptions will not be repeated here.

In another embodiment, reference is made to FIG. 7C, which is a timing diagram illustrating the driving signal of the touch display panel according to a third embodiment of this disclosure. In this embodiment, the display stage TP1 and the fingerprint sensing stage TP3 are separately described. In another embodiment, the display stage TP1 and the fingerprint sensing stage TP3 may also be combined as described in the foregoing embodiment, and the disclosure is not limited thereto. The difference between the timing diagram shown in FIG. 7C and the timing diagram shown in FIG. 7A is that the controlling signal CTL2 is utilized to conduct the second sensing matrix 180. The controlling signal CTL2 remains at the enable level VGH in the display stage TP1, the touch sensing stage TP2, and the fingerprint sensing stage TP3, and thus the second sensing matrix 180 can be realized as an electrode layer. The control circuit 210 is configured to transmit the synchronization signal synchronized with the first driving signal DS1 and the second driving signal DS2 to the second sensing matrix 180. Therefore, the second sensing matrix 180 and the touch sensing matrix 140 can achieve the effect of force touch.

In another embodiment, reference is made to FIG. 7D, which is a timing diagram illustrating the driving signal of the touch display panel according to a fourth embodiment of this disclosure. In this embodiment, the display stage TP1 and the fingerprint sensing stage TP3 are separately described. In another embodiment, the display stage TP1 and the fingerprint sensing stage TP3 may also be combined as described in the foregoing embodiment, and the disclosure is not limited thereto. The difference between the timing diagram shown in FIG. 7D and the timing diagram shown in FIG. 7C is that the controlling signal CTL2 switches to the disable level VGL to switch off the switch unit 183. In this time, the second sensing matrix 180 is in the floating state, and the common signal COM is coupled to the couple voltage level VC. In this case, the first sensing matrix 170 and the second sensing matrix 180 are in the floating state, and thus the touch signal of the touch sensing matrix 140 can be coupled to the outside via the floating first sensing matrix 170 and the floating second sensing matrix 180. Therefore, it can maintain the original touch effect and avoid signal shielding.

Figure 8:
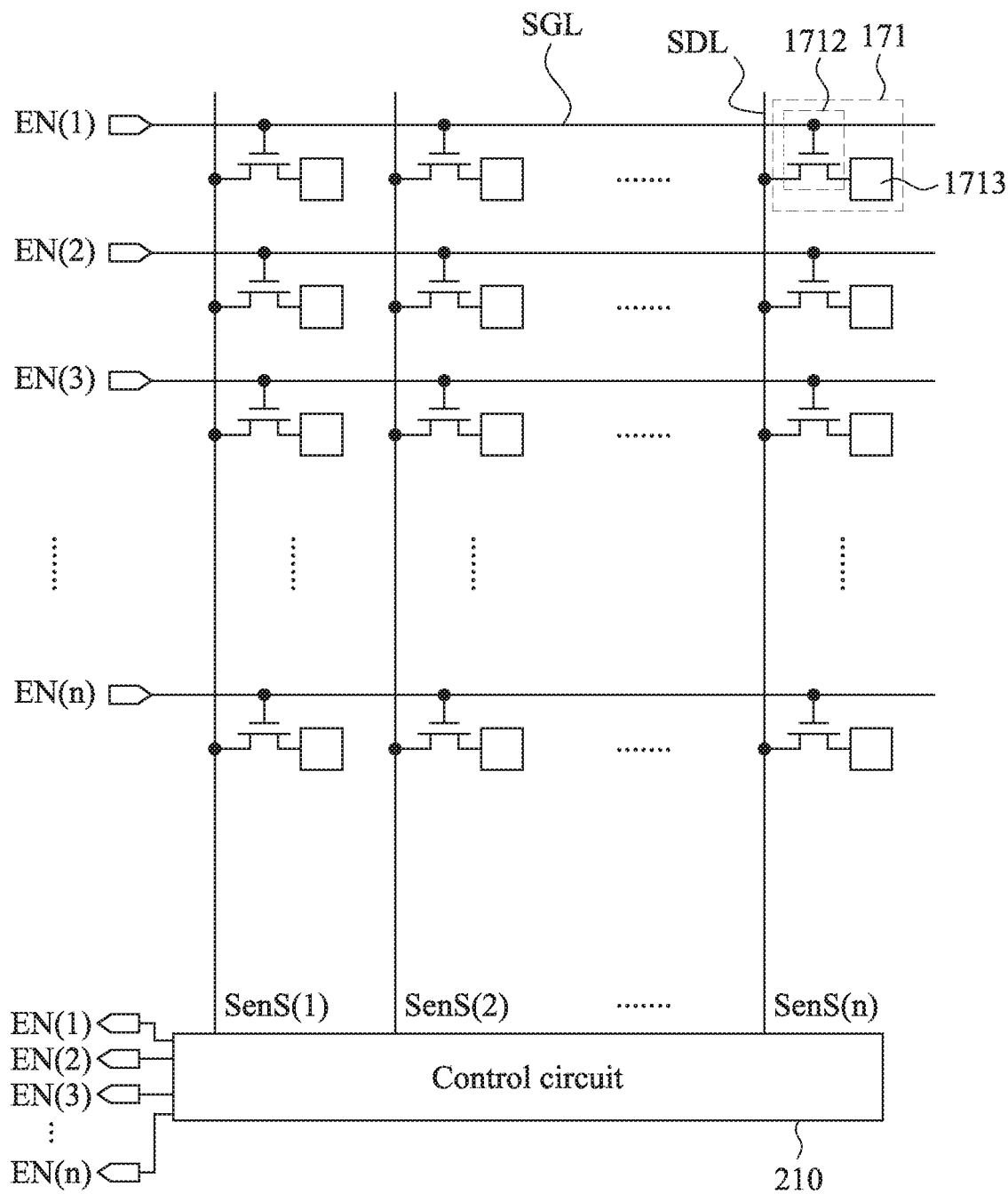
FIG. 8 is a schematic diagram of the first sensing matrix according to another embodiment of the present disclosure.

In another embodiment, reference is made to FIG. 8, which is a schematic diagram of the first sensing matrix 170 according to another embodiment of the present disclosure. The difference between the first sensing matrix 170 shown in FIG. 2B and the first sensing matrix 170 shown in FIG. 8 is that the embodiment shown in FIG. 8 lacks the switch unit 172. The control circuit 210 is electrically connected to the sensing units 1711 via the sensing gate lines SGL and the sensing data lines SDL. The control circuit 210 is configured to conduct the switch 1712 according to the enable signal EN(1)~EN(N), and the sensing signal SenS(1)~SenS(m) sensed by the sensing electrode 1713 is transmitted to the control circuit 210 via the sensing data lines SDL.

Afterwards, the second sensing matrix 180 shown in FIG. 3A, the touch sensing matrix 140 shown in FIG. 5B can be used to integrate with the first sensing matrix 170 shown in FIG. 8. In the embodiment, to prevent the first sensing matrix 170 from causing signal shielding on the touch sensing matrix 140, the control circuit 210 is configured to generate the synchronization signal and transmit the synchronization signal to the first sensing matrix 170 and the second sensing matrix 180. In this operation, the second sensing matrix 180 and the touch sensing matrix 140 can achieve the effect of force touch, in the touch sensing stage TP2.

Based on aforesaid embodiments, the touch display panel is capable of utilizing the second sensing matrix to shield the signal of the sensing electrode and to avoid the interference effect between the signal of the sensing electrode and the pixel circuit. During the sensing period of the touch electrode, the synchronization signal provided by the control circuit is used or the second sensing matrix is kept in the floating state, and thus the interference effect between the sensing electrode and the touch electrode can be decreased. Moreover, when the touch pressure changes, the gap of the liquid crystal layer (Cell gap) between the second sensing matrix and the touch sensing matrix is changed. Therefore, it can achieve the function of force touch.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A touch display panel having a display area and a peripheral area adjacent to the display area, comprising:
   a first sensing matrix, disposed on one side of a first substrate and the display area, comprising:
      a plurality of grid units, arranged in matrix, wherein each of the grid units comprises at least one first electrode; and
      a first switch unit, comprising a plurality of switches, the plurality of switches are disposed adjacent to one side of the plurality of grid units, wherein a control end of the plurality of switches is configured to receive a first controlling signal; one end of each of the switches is electrically connected to one of the plurality of grid units, and the plurality of switches are configured to transmit a sensing signal according to the first controlling signal;
   a second sensing matrix, disposed on the one side of the first substrate and the display area, and the second sensing matrix comprises at least one second electrode, and is configured to receive a common signal, comprising:
      a plurality of opening units, each of the plurality of opening units overlaps with an open area of each pixel circuit in a vertical projection direction of the first substrate; and
   a third sensing matrix, disposed on one side of a second substrate, comprising:
      a plurality of third electrodes, arranged in matrix, wherein the one side of the first substrate is opposite to one side of the second substrate.

2. The touch display panel of claim 1, wherein the plurality of switches further comprising:
   a plurality of first switches, disposed adjacent to the one side of the plurality of grid units, wherein a control end of the plurality of first switches is configured to receive the first controlling signal; one end of each of the first switches is configured to output the sensing signal, and another end of the plurality of first switches is electrically connected to one of the plurality of grid units.

3. The touch display panel of claim 1, wherein the plurality of switches further comprising:
   a plurality of second switches, disposed adjacent to the one side of the plurality of grid units, wherein a control end of the plurality of second switches is configured to receive the first controlling signal; one end of each of the second switches is configured to receive an enable signal, and another end of the plurality of second switches is electrically connected to one of the plurality of grid units.

4. The touch display panel of claim 1, wherein the third sensing matrix further comprising:
   a fourth electrode, disposed between the plurality of third electrodes, wherein the fourth electrode is electrically insulated from the plurality of third electrodes, and the fourth electrode substantially surrounds the third sensing matrix.

5. The touch display panel of claim 4, wherein a vertical projection of the first switch unit on the one side of the first substrate substantially overlaps the fourth electrode.

6. The touch display panel of claim 1, wherein a part of the plurality of switches are disposed in the peripheral area.

7. The touch display panel of claim 1, wherein the at least one second electrode is electrically connected to each other, and is configured to receive the common signal.

8. The touch display panel of claim 1, wherein the second sensing matrix further comprising:
   a second switch unit, comprising a plurality of third switches, disposed between the at least one second electrode, wherein a control end of the plurality of third switches is configured to receive a second controlling signal; one end of each of the third switches is configured to receive the common signal, and another end of each of the third switches is electrically connected to the at least one second electrode.

9. The touch display panel of claim 8, wherein a part of the plurality of third switches are disposed in the peripheral area.

10. The touch display panel of claim 8, wherein,
    in a first stage, disabling the first switch unit and the second switch unit to cause the plurality of grid units and the at least one second electrode keep a floating state, and providing a driving signal to the plurality of third electrodes in sequence to cause the third sensing matrix execute a touching function; and
    in a second stage, providing the first controlling signal to enable the first switch unit, and providing the second controlling signal to enable the second switch unit, and transmitting the sensing signal from the plurality of grid units to cause the first sensing matrix execute a recognition function and the second sensing matrix and the third sensing matrix execute a force sensing function.

11. The touch display panel of claim 8, wherein,
    in a first stage, disabling the first switch unit to cause the plurality of grid units and the at least one second electrode keep a floating state, and enabling the second switch unit according to the second controlling signal to cause the at least one second electrode receive the common signal, and providing a driving signal to the plurality of third electrodes in sequence to cause the third sensing matrix execute a touching function; and
    in a second stage, enabling the first switch unit according to the first controlling signal, and enabling the second switch unit according to the second controlling signal; transmitting the sensing signal from the plurality of grid units to cause the first sensing matrix execute a recognition function and the second sensing matrix and the third sensing matrix execute a force sensing function.

12. The touch display panel of claim 1, wherein a vertical projection of each of the grid units on the one side of the first substrate substantially overlaps each of the third electrodes.

13. The touch display panel of claim 1, further comprising:
    a color filter, disposed between the second sensing matrix and a display medium; and
    a pixel array layer, disposed between the second substrate and the third sensing matrix.

14. The touch display panel of claim 1, wherein,
in a first stage, disabling the first switch unit to cause the plurality of grid units keep a floating state, and providing a driving signal to the plurality of third electrodes in sequence to cause the third sensing matrix execute a touching function; and
in a second stage, providing the first controlling signal to enable the first switch unit, and transmitting the sensing signal from the plurality of grid units to cause the first sensing matrix execute a recognition function.

15. A touch display panel having a display area and a peripheral area adjacent to the display area, comprising:
a first sensing matrix, disposed on one side of a first substrate and the display area, comprising:
a plurality of first data lines;
a plurality of first gate lines;
a plurality of first units, comprising a plurality of first switches and a plurality of first electrodes, the plurality of first switches comprises a first control end, a first end and a second end, wherein the first control end of each of the first switches is electrically connected to one of the plurality of first gate lines; the first end of each of the first switches is electrically connected to one of the plurality of first data lines; the second end of each of the first switches is electrically connected to one of the plurality of first electrodes;
a second sensing matrix, disposed on the one side of the first substrate, and the second sensing matrix comprises at least one second electrode, and is configured to receive a common signal, comprising:
a plurality of opening units, each of the plurality of opening units overlaps with an open area of each pixel circuit in a vertical projection direction of the first substrate; and
a third sensing matrix, disposed on one side of a second substrate, comprising:
a plurality of third electrodes, arranged in matrix.

16. A touch display panel having a display area and a peripheral area adjacent to the display area, comprising:
a first electrode layer, disposed on one side of a first substrate and the display area, comprising:
a grid unit, comprising a first electrode; and
a first switch unit, one end of the first switch unit is electrically connected to a sensing data line, and another end of the first switch unit is electrically connected to the grid unit;
a second electrode layer, disposed on one side of the first substrate and the display area, and the second electrode layer is configured to receive a common signal, comprising:
a second electrode; and
an opening unit, overlaps with an open area of a pixel circuit in a vertical projection direction of the first substrate; and
a third electrode layer, disposed on one side of a second substrate, comprising:
a third electrode; and
a fourth electrode, substantially surrounds the third electrode, and the fourth electrode is electrically insulated from the third electrode; and
a display array, disposed between the second substrate and the third electrode layer, and the one side of the first substrate is opposite to the one side of the second substrate.

17. The touch display panel of claim 16, wherein the first electrode layer, further comprising:
a second switch unit, wherein one end of the second switch unit is electrically coupled to a sensing gate line, and another end of the second switch unit is electrically coupled to the grid unit.

18. The touch display panel of claim 17, the second electrode layer further comprising:
a second switch unit, one end of the second switch unit is electrically connected to a common signal line, and another end of the second switch unit is electrically connected to the second electrode.

* * * * *